US008514692B2

(12) United States Patent
Laroia et al.

(10) Patent No.: US 8,514,692 B2
(45) Date of Patent: Aug. 20, 2013

(54) METHODS AND APPARATUS FOR DETERMINING, COMMUNICATING AND USING INFORMATION WHICH CAN BE USED FOR INTERFERENCE CONTROL PURPOSES

(75) Inventors: Rajiv Laroia, Basking Ridge, NJ (US); Junyi Li, Bedminster, NJ (US); Sundeep Rangan, Jersey City, NJ (US); Murari Srinivasan, Palo Alto, CA (US); Prashanth Hande, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 250 days.

(21) Appl. No.: 11/251,069

(22) Filed: Oct. 14, 2005

(65) Prior Publication Data

US 2006/0083161 A1   Apr. 20, 2006

Related U.S. Application Data

(63) Continuation-in-part of application No. 10/648,767, filed on Aug. 25, 2003.

(60) Provisional application No. 60/618,773, filed on Oct. 14, 2004, provisional application No. 60/449,729, filed on Feb. 24, 2003.

(51) Int. Cl.
*H04J 11/00* (2006.01)
*H04B 1/00* (2006.01)

(52) U.S. Cl.
USPC ......... 370/208; 370/342; 455/67.11; 455/522

(58) Field of Classification Search
USPC ................ 370/208, 335, 342; 455/69, 67.11, 455/67.13, 63.1, 522, 437
See application file for complete search history.

(56) References Cited

U.S. PATENT DOCUMENTS 4,631,720 A   12/1986   Koeck
4,660,196 A    4/1987   Gray et al.
(Continued)

FOREIGN PATENT DOCUMENTS

CN   1265792    9/2000
CN   1316140   10/2001
(Continued)

OTHER PUBLICATIONS

Gunnarson et al., "Uplink Admission Control in WCDMA Based on Relative Load Estimates", IEEE International Conference on Communications, Apr. 28, 2002 pp. 3091-3095, vol. 1, IEEE, New York, NY USA.

(Continued)

*Primary Examiner* — Lee Nguyen
(74) *Attorney, Agent, or Firm* — John J. Ketchum

(57) ABSTRACT

Methods and apparatus for collecting, measuring, reporting and/or using information which can be used for interference control purposes. Wireless terminals measure signals transmitted from one or more base stations, e.g., base station sector transmitters. The measured signals may be, e.g., beacon signals and/or pilot signals. From the measured signals, the wireless terminal generates one or more gain ratios which provide information about the relative gain of the communications channels from different base station sectors to the wireless terminal. This information represents interference information since it provides information about the signal interference that will be caused by transmissions from other base station sectors relative to transmissions made by the base station sector to which the wireless terminal is attached. Based on the signal energy measurements and relative gains generated from the energy measures, reports are generated in accordance with the invention and sent to one or more base stations.

31 Claims, 8 Drawing Sheets

(56) References Cited

U.S. PATENT DOCUMENTS

| | | |
|---|---|---|
| 4,679,244 A | 7/1987 | Kawasaki et al. |
| 4,833,701 A | 5/1989 | Comroe et al. |
| 5,128,938 A | 7/1992 | Borras |
| 5,203,013 A | 4/1993 | Breeden et al. |
| 5,387,905 A | 2/1995 | Grube et al. |
| 5,461,645 A | 10/1995 | Ishii |
| 5,506,865 A | 4/1996 | Weaver, Jr. |
| 5,537,414 A | 7/1996 | Takiyasu et al. |
| 5,579,307 A | 11/1996 | Richetta et al. |
| 5,732,328 A | 3/1998 | Mitra et al. |
| 5,835,847 A | 11/1998 | Gilmore et al. |
| 5,867,478 A | 2/1999 | Baum et al. |
| 5,898,925 A | 4/1999 | Honkasalo et al. |
| 5,914,950 A | 6/1999 | Tiedemann, Jr. et al. |
| 5,915,221 A | 6/1999 | Sawyer et al. |
| 5,933,421 A | 8/1999 | Alamouti et al. |
| 5,966,657 A | 10/1999 | Sporre |
| 5,978,657 A | 11/1999 | Suzuki |
| 6,004,276 A | 12/1999 | Wright et al. |
| 6,026,081 A | 2/2000 | Hamabe |
| 6,035,000 A | 3/2000 | Bingham |
| 6,070,072 A | 5/2000 | Dorenbosch et al. |
| 6,073,025 A | 6/2000 | Sadri |
| 6,075,025 A | 6/2000 | Bishop et al. |
| 6,122,270 A | 9/2000 | Whinnett et al. |
| 6,131,016 A | 10/2000 | Greenstein et al. |
| 6,169,896 B1 | 1/2001 | Sant et al. |
| 6,173,005 B1 | 1/2001 | Kotzin et al. |
| 6,236,646 B1 | 5/2001 | Beming et al. |
| 6,256,478 B1 | 7/2001 | Allen et al. |
| 6,259,927 B1 | 7/2001 | Butovitsch et al. |
| 6,263,392 B1 | 7/2001 | McCauley et al. |
| 6,298,233 B1 | 10/2001 | Souissi et al. |
| 6,308,080 B1 | 10/2001 | Burt et al. |
| 6,374,085 B1 | 4/2002 | Saints et al. |
| 6,377,955 B1 | 4/2002 | Hartmann et al. |
| 6,405,047 B1 | 6/2002 | Moon et al. |
| 6,414,946 B1 | 7/2002 | Satou et al. |
| 6,445,917 B1 | 9/2002 | Bark et al. |
| 6,453,151 B1 | 9/2002 | Kiang et al. |
| 6,493,539 B1 | 12/2002 | Falco et al. |
| 6,526,281 B1 | 2/2003 | Gorsuch et al. |
| 6,538,986 B2 | 3/2003 | Isaksson et al. |
| 6,545,999 B1 | 4/2003 | Sugita et al. |
| 6,549,780 B2 | 4/2003 | Schiff et al. |
| 6,553,336 B1 | 4/2003 | Johnson et al. |
| 6,590,890 B1 | 7/2003 | Stolyar et al. |
| 6,597,914 B1 | 7/2003 | Silventoinen et al. |
| 6,600,903 B1 | 7/2003 | Lilja et al. |
| 6,609,007 B1 | 8/2003 | Eibling et al. |
| 6,621,808 B1 | 9/2003 | Sadri |
| 6,625,133 B1 | 9/2003 | Balachandran et al. |
| 6,662,024 B2 | 12/2003 | Walton et al. |
| 6,671,512 B2 | 12/2003 | Laakso |
| 6,680,909 B1 | 1/2004 | Bansal et al. |
| 6,697,417 B2 | 2/2004 | Fernandez-Corbaton et al. |
| 6,710,651 B2 | 3/2004 | Forrester et al. |
| 6,728,551 B2 | 4/2004 | Chang |
| 6,745,003 B1 | 6/2004 | Maca et al. |
| 6,751,187 B2 | 6/2004 | Walton et al. |
| 6,771,934 B2 | 8/2004 | Demers et al. |
| 6,788,963 B2 | 9/2004 | Laroia et al. |
| 6,798,761 B2 | 9/2004 | Cain et al. |
| 6,804,289 B2 | 10/2004 | Takahashi |
| 6,804,521 B2 | 10/2004 | Tong et al. |
| 6,816,476 B2 | 11/2004 | Kim et al. |
| 6,836,673 B1 | 12/2004 | Trott et al. |
| 6,865,168 B1 | 3/2005 | Sekine et al. |
| 6,889,056 B2 | 5/2005 | Shibutani et al. |
| 6,892,071 B2 | 5/2005 | Park et al. |
| 6,895,005 B1 | 5/2005 | Malin et al. |
| 6,895,364 B2 | 5/2005 | Banfer |
| 6,901,268 B2 | 5/2005 | Chang |
| 6,904,016 B2 | 6/2005 | Kuo et al. |
| 6,912,405 B2 | 6/2005 | Hiramatsu et al. |
| 6,917,607 B1 | 7/2005 | Yeom et al. |
| 6,940,827 B2 | 9/2005 | Li et al. |
| 6,954,643 B2 | 10/2005 | Petrus |
| 6,957,072 B2 | 10/2005 | Kangras et al. |
| 6,967,937 B1 | 11/2005 | Gormley |
| 6,968,156 B2 | 11/2005 | Sugaya et al. |
| 7,006,841 B2 | 2/2006 | Monogioudis et al. |
| 7,024,460 B2 | 4/2006 | Koopmas et al. |
| 7,027,782 B2 | 4/2006 | Moon et al. |
| 7,031,983 B2 | 4/2006 | Israni et al. |
| 7,034,254 B2 | 4/2006 | Grabowski et al. |
| 7,039,029 B2 | 5/2006 | Lee et al. |
| 7,043,254 B2 | 5/2006 | Chawla et al. |
| 7,047,009 B2 | 5/2006 | Laroia et al. |
| 7,054,643 B2 | 5/2006 | Trossen et al. |
| 7,061,885 B2 | 6/2006 | Kurtz et al. |
| 7,092,672 B1 | 8/2006 | Pekonen et al. |
| 7,120,123 B1 | 10/2006 | Quigley et al. |
| 7,120,448 B2 | 10/2006 | Brouwer |
| 7,123,910 B2 | 10/2006 | Lucidarme et al. |
| 7,139,536 B2 | 11/2006 | Chiu et al. |
| 7,142,548 B2 | 11/2006 | Fong et al. |
| 7,146,172 B2 | 12/2006 | Li et al. |
| 7,158,796 B2 | 1/2007 | Tiedemann, Jr. et al. |
| 7,162,203 B1 | 1/2007 | Brunner |
| 7,164,883 B2 | 1/2007 | Rappaport et al. |
| 7,197,025 B2 | 3/2007 | Chuah et al. |
| 7,203,493 B2 | 4/2007 | Fujii et al. |
| 7,218,948 B2 | 5/2007 | Laroia et al. |
| 7,245,935 B2 | 7/2007 | Lin et al. |
| 7,260,054 B2 | 8/2007 | Olszewski |
| 7,269,406 B2 | 9/2007 | Qi et al. |
| 7,277,709 B2 | 10/2007 | Vadgama |
| 7,277,737 B1 | 10/2007 | Vollmer et al. |
| 7,280,814 B2 | 10/2007 | Austin et al. |
| 7,283,559 B2 | 10/2007 | Cho et al. |
| 7,283,836 B2 | 10/2007 | Hwang et al. |
| 7,299,277 B1 | 11/2007 | Moran et al. |
| 7,319,680 B2 | 1/2008 | Cho et al. |
| 7,321,563 B2 | 1/2008 | Kim et al. |
| 7,340,267 B2 | 3/2008 | Budka et al. |
| 7,349,667 B2 | 3/2008 | Magee et al. |
| 7,356,635 B2 | 4/2008 | Woodings et al. |
| 7,362,702 B2 | 4/2008 | Terrell et al. |
| 7,382,755 B2 | 6/2008 | Dugad et al. |
| 7,395,058 B1 | 7/2008 | Kalofonos et al. |
| 7,397,803 B2 | 7/2008 | Love et al. |
| 7,400,901 B2 | 7/2008 | Kostic et al. |
| 7,412,265 B2 | 8/2008 | Chen et al. |
| 7,418,260 B2 | 8/2008 | Lucidarme et al. |
| 7,420,939 B2 | 9/2008 | Laroia et al. |
| 7,430,206 B2 | 9/2008 | Terry et al. |
| 7,430,207 B2 | 9/2008 | Wu et al. |
| 7,430,420 B2 | 9/2008 | Derakhshan et al. |
| 7,447,148 B2 | 11/2008 | Gao et al. |
| 7,463,577 B2 | 12/2008 | Sudo et al. |
| 7,486,620 B2 | 2/2009 | Seol et al. |
| 7,486,638 B2 | 2/2009 | Ofuji et al. |
| 7,502,614 B2 | 3/2009 | Uchida et al. |
| 7,508,792 B2 | 3/2009 | Petrovic et al. |
| 7,510,828 B2 | 3/2009 | Lynn et al. |
| 7,512,076 B2 | 3/2009 | Kwon et al. |
| 7,512,185 B2 | 3/2009 | Sharon et al. |
| 7,519,013 B2 | 4/2009 | Destino et al. |
| 7,519,033 B2 | 4/2009 | Soomro et al. |
| 7,522,544 B2 | 4/2009 | Cheng et al. |
| 7,525,971 B2 | 4/2009 | Carroll et al. |
| 7,526,091 B2 | 4/2009 | Jeong et al. |
| 7,539,475 B2 | 5/2009 | Laroia et al. |
| 7,558,235 B2 | 7/2009 | Lester et al. |
| 7,558,572 B2 | 7/2009 | Anigstein |
| 7,561,893 B2 | 7/2009 | Moulsley et al. |
| 7,668,573 B2 | 2/2010 | Laroia et al. |
| 7,743,284 B1 | 6/2010 | Taylor et al. |
| 8,437,251 B2 | 5/2013 | Das et al. |
| 2001/0036181 A1 | 11/2001 | Rogers |
| 2001/0046878 A1 | 11/2001 | Chang et al. |
| 2002/0031105 A1 | 3/2002 | Zeira et al. |
| 2002/0037729 A1 | 3/2002 | Kitazawa et al. |

| Publication No. | Date | Inventors |
|---|---|---|
| 2002/0045448 A1 | 4/2002 | Park et al. |
| 2002/0049040 A1 | 4/2002 | Sugaya et al. |
| 2002/0077140 A1 | 6/2002 | Monogioudis et al. |
| 2002/0080967 A1 | 6/2002 | Abdo et al. |
| 2002/0082011 A1 | 6/2002 | Fujii et al. |
| 2002/0085516 A1 | 7/2002 | Bridgelall |
| 2002/0093953 A1 | 7/2002 | Naim et al. |
| 2002/0107028 A1 | 8/2002 | Rantalainen et al. |
| 2002/0122431 A1 | 9/2002 | Cho et al. |
| 2002/0136195 A1 | 9/2002 | Kurtz et al. |
| 2002/0142788 A1 | 10/2002 | Chawla et al. |
| 2002/0147017 A1 | 10/2002 | Li et al. |
| 2002/0160802 A1 | 10/2002 | Hiramatsu et al. |
| 2002/0177452 A1 | 11/2002 | Ruutu et al. |
| 2002/0186678 A1 | 12/2002 | Averbuch et al. |
| 2003/0003921 A1 | 1/2003 | Laakso et al. |
| 2003/0027587 A1 | 2/2003 | Proctor, Jr. |
| 2003/0064737 A1 | 4/2003 | Eriksson et al. |
| 2003/0078067 A1 | 4/2003 | Kim et al. |
| 2003/0095519 A1 | 5/2003 | Kuo et al. |
| 2003/0114180 A1 | 6/2003 | Black et al. |
| 2003/0123396 A1 | 7/2003 | Seo et al. |
| 2003/0123410 A1 | 7/2003 | Youm |
| 2003/0139197 A1 | 7/2003 | Kostic et al. |
| 2003/0157899 A1 | 8/2003 | Trossen et al. |
| 2003/0169705 A1 | 9/2003 | Knisely et al. |
| 2003/0185224 A1 | 10/2003 | Ramanan et al. |
| 2003/0185285 A1 | 10/2003 | Talwar |
| 2003/0193915 A1 | 10/2003 | Lee et al. |
| 2003/0198206 A1 | 10/2003 | Cain et al. |
| 2003/0206541 A1 | 11/2003 | Yun et al. |
| 2003/0207691 A1 | 11/2003 | Chen |
| 2003/0207693 A1 | 11/2003 | Roderique |
| 2003/0214906 A1 | 11/2003 | Hu et al. |
| 2003/0214928 A1 | 11/2003 | Chuah et al. |
| 2003/0223354 A1 | 12/2003 | Olszewski et al. |
| 2004/0001429 A1 | 1/2004 | Ma et al. |
| 2004/0004954 A1 | 1/2004 | Terry et al. |
| 2004/0013103 A1 | 1/2004 | Zhang et al. |
| 2004/0057402 A1 | 3/2004 | Ramos et al. |
| 2004/0081089 A1 | 4/2004 | Ayyagari et al. |
| 2004/0082344 A1 | 4/2004 | Moilanen et al. |
| 2004/0085936 A1 | 5/2004 | Gopalakrishnan et al. |
| 2004/0091026 A1 | 5/2004 | Nakayama |
| 2004/0111640 A1 | 6/2004 | Baum |
| 2004/0120411 A1 | 6/2004 | Walton et al. |
| 2004/0127226 A1 | 7/2004 | Dugad et al. |
| 2004/0141466 A1 | 7/2004 | Kim et al. |
| 2004/0147262 A1 | 7/2004 | Lescuyer et al. |
| 2004/0160922 A1 | 8/2004 | Nanda et al. |
| 2004/0166886 A1 | 8/2004 | Laroia et al. |
| 2004/0166887 A1* | 8/2004 | Laroia et al. .................. 455/522 |
| 2004/0180658 A1 | 9/2004 | Uchida et al. |
| 2004/0184410 A1 | 9/2004 | Park |
| 2004/0192371 A1 | 9/2004 | Zhao et al. |
| 2004/0196802 A1 | 10/2004 | Bae et al. |
| 2004/0203717 A1 | 10/2004 | Wingrowicz et al. |
| 2004/0203981 A1 | 10/2004 | Budka et al. |
| 2004/0223455 A1 | 11/2004 | Fong et al. |
| 2004/0224677 A1 | 11/2004 | Kuchibhotla et al. |
| 2004/0228313 A1 | 11/2004 | Cheng et al. |
| 2004/0233838 A1 | 11/2004 | Sudo et al. |
| 2004/0235510 A1 | 11/2004 | Elicegui et al. |
| 2004/0248518 A1 | 12/2004 | Kashiwase |
| 2004/0248568 A1 | 12/2004 | Lucidarme et al. |
| 2004/0252662 A1 | 12/2004 | Cho et al. |
| 2004/0253996 A1 | 12/2004 | Chen et al. |
| 2004/0259546 A1 | 12/2004 | Balachandran et al. |
| 2004/0264414 A1 | 12/2004 | Dorenbosch |
| 2004/0266474 A1 | 12/2004 | Petrus et al. |
| 2005/0003847 A1 | 1/2005 | Love et al. |
| 2005/0008892 A1 | 1/2005 | Yamamoto et al. |
| 2005/0037775 A1 | 2/2005 | Moeglein et al. |
| 2005/0047344 A1 | 3/2005 | Seol et al. |
| 2005/0047393 A1 | 3/2005 | Liu et al. |
| 2005/0047416 A1 | 3/2005 | Heo et al. |
| 2005/0053099 A1 | 3/2005 | Spear et al. |
| 2005/0058637 A1 | 3/2005 | Lynn et al. |
| 2005/0068922 A1 | 3/2005 | Jalali |
| 2005/0099987 A1 | 5/2005 | Lester et al. |
| 2005/0111361 A1 | 5/2005 | Hosein et al. |
| 2005/0111462 A1 | 5/2005 | Walton et al. |
| 2005/0122900 A1 | 6/2005 | Tuulos et al. |
| 2005/0124345 A1 | 6/2005 | Laroia et al. |
| 2005/0128999 A1 | 6/2005 | Kwon et al. |
| 2005/0136937 A1 | 6/2005 | Qian et al. |
| 2005/0143084 A1 | 6/2005 | Cheng et al. |
| 2005/0143114 A1 | 6/2005 | Moulsley et al. |
| 2005/0152320 A1 | 7/2005 | Marinier et al. |
| 2005/0157803 A1 | 7/2005 | Kim et al. |
| 2005/0157876 A1 | 7/2005 | Jeong et al. |
| 2005/0170782 A1 | 8/2005 | Rong et al. |
| 2005/0181732 A1 | 8/2005 | Kang et al. |
| 2005/0195765 A1 | 9/2005 | Sharon et al. |
| 2005/0201331 A1 | 9/2005 | Marinier et al. |
| 2005/0207335 A1 | 9/2005 | Schmidl et al. |
| 2005/0207359 A1 | 9/2005 | Hwang et al. |
| 2005/0243938 A1 | 11/2005 | Armstrong et al. |
| 2005/0249118 A1 | 11/2005 | Terry et al. |
| 2005/0250509 A1 | 11/2005 | Choksi et al. |
| 2005/0250529 A1 | 11/2005 | Funnell et al. |
| 2005/0259662 A1 | 11/2005 | Kim et al. |
| 2005/0265301 A1 | 12/2005 | Heo et al. |
| 2005/0281232 A1 | 12/2005 | Kim et al. |
| 2005/0289256 A1 | 12/2005 | Cudak et al. |
| 2006/0003767 A1 | 1/2006 | Kim et al. |
| 2006/0015357 A1 | 1/2006 | Cagan |
| 2006/0019694 A1 | 1/2006 | Sutivong et al. |
| 2006/0040696 A1 | 2/2006 | Lin et al. |
| 2006/0056346 A1 | 3/2006 | Vadgama et al. |
| 2006/0073836 A1 | 4/2006 | Laroia et al. |
| 2006/0079257 A1 | 4/2006 | Iochi et al. |
| 2006/0083161 A1 | 4/2006 | Laroia et al. |
| 2006/0089104 A1 | 4/2006 | Kaikkonen et al. |
| 2006/0092881 A1* | 5/2006 | Laroia et al. .................. 370/331 |
| 2006/0104240 A1 | 5/2006 | Sebire et al. |
| 2006/0128410 A1 | 6/2006 | Derryberry et al. |
| 2006/0135193 A1 | 6/2006 | Ratasuk et al. |
| 2006/0140154 A1 | 6/2006 | Kwak et al. |
| 2006/0142032 A1 | 6/2006 | Derakhshan et al. |
| 2006/0164981 A1 | 7/2006 | Olsson et al. |
| 2006/0176807 A1 | 8/2006 | Wu et al. |
| 2006/0203765 A1 | 9/2006 | Laroia et al. |
| 2006/0205356 A1 | 9/2006 | Laroia et al. |
| 2006/0205396 A1 | 9/2006 | Laroia et al. |
| 2006/0215604 A1 | 9/2006 | Mueckenheim et al. |
| 2006/0234722 A1 | 10/2006 | Hanebeck et al. |
| 2006/0245452 A1 | 11/2006 | Frederiksen et al. |
| 2006/0246916 A1 | 11/2006 | Cheng et al. |
| 2006/0270399 A1 | 11/2006 | Qi et al. |
| 2006/0285481 A1 | 12/2006 | Lane et al. |
| 2006/0287743 A1 | 12/2006 | Sampath et al. |
| 2007/0002757 A1 | 1/2007 | Soomro et al. |
| 2007/0002806 A1 | 1/2007 | Soomro et al. |
| 2007/0004437 A1 | 1/2007 | Harada et al. |
| 2007/0015541 A1 | 1/2007 | Dominique et al. |
| 2007/0026803 A1 | 2/2007 | Malm et al. |
| 2007/0026808 A1 | 2/2007 | Love et al. |
| 2007/0030828 A1 | 2/2007 | Vimpari et al. |
| 2007/0066273 A1 | 3/2007 | Laroia et al. |
| 2007/0070894 A1 | 3/2007 | Wang et al. |
| 2007/0081492 A1 | 4/2007 | Petrovic et al. |
| 2007/0081498 A1 | 4/2007 | Niwano et al. |
| 2007/0104128 A1 | 5/2007 | Laroia et al. |
| 2007/0104164 A1 | 5/2007 | Laroia et al. |
| 2007/0140168 A1 | 6/2007 | Laroia et al. |
| 2007/0140179 A1 | 6/2007 | Zhang et al. |
| 2007/0141994 A1 | 6/2007 | Cheng et al. |
| 2007/0147283 A1 | 6/2007 | Laroia et al. |
| 2007/0147377 A1 | 6/2007 | Laroia et al. |
| 2007/0149126 A1 | 6/2007 | Rangan et al. |
| 2007/0149128 A1 | 6/2007 | Das et al. |
| 2007/0149129 A1 | 6/2007 | Das et al. |
| 2007/0149131 A1 | 6/2007 | Li et al. |
| 2007/0149132 A1 | 6/2007 | Li et al. |
| 2007/0149137 A1 | 6/2007 | Richardson et al. |
| 2007/0149138 A1 | 6/2007 | Das et al. |
| 2007/0149194 A1 | 6/2007 | Das et al. |

| | | | | | | |
|---|---|---|---|---|---|---|
| 2007/0149227 | A1 | 6/2007 | Parizhsky et al. | JP | 2005526417 A | 9/2005 |
| 2007/0149228 | A1 | 6/2007 | Das et al. | JP | 2005333671 | 12/2005 |
| 2007/0149238 | A1 | 6/2007 | Das et al. | JP | 2006514735 A | 5/2006 |
| 2007/0159969 | A1 | 7/2007 | Das et al. | JP | 2006518578 A | 8/2006 |
| 2007/0168326 | A1 | 7/2007 | Das et al. | JP | 06268574 A | 10/2006 |
| 2007/0173208 | A1 | 7/2007 | Nishio et al. | JP | 2006524966 T | 11/2006 |
| 2007/0183308 | A1 | 8/2007 | Korobkov et al. | JP | 2006526323 A | 11/2006 |
| 2007/0213087 | A1 | 9/2007 | Laroia et al. | JP | 2007509531 A | 4/2007 |
| 2007/0243882 | A1 | 10/2007 | Edge | JP | 2007514364 A | 5/2007 |
| 2007/0249287 | A1 | 10/2007 | Das et al. | JP | 2007514378 T | 5/2007 |
| 2007/0249360 | A1 | 10/2007 | Das et al. | JP | 2007522692 A | 8/2007 |
| 2007/0253355 | A1 | 11/2007 | Hande et al. | JP | 2007525044 A | 8/2007 |
| 2007/0253357 | A1 | 11/2007 | Das et al. | JP | 2007525045 T | 8/2007 |
| 2007/0253358 | A1 | 11/2007 | Das et al. | JP | 1841259 A2 | 10/2007 |
| 2007/0253385 | A1 | 11/2007 | Li et al. | JP | 2011045054 | 3/2011 |
| 2007/0253449 | A1 | 11/2007 | Das et al. | JP | 4723477 B2 | 7/2011 |
| 2007/0258365 | A1 | 11/2007 | Das et al. | KR | 1019990084525 | 12/1999 |
| 2008/0037474 | A1 | 2/2008 | Niwano | KR | 20010014223 | 2/2001 |
| 2008/0051086 | A2 | 2/2008 | Etemad et al. | KR | 20040018526 | 3/2004 |
| 2008/0057969 | A1 | 3/2008 | Agami et al. | KR | 20040053859 A | 6/2004 |
| 2008/0076462 | A1 | 3/2008 | Iochi et al. | KR | 20040084599 A | 10/2004 |
| 2008/0144521 | A1 | 6/2008 | Soomro et al. | KR | 20040110044 A | 12/2004 |
| 2008/0159235 | A1 | 7/2008 | Son et al. | KR | 20050021083 A | 3/2005 |
| 2009/0004983 | A1 | 1/2009 | Darabi et al. | KR | 20050023187 A | 3/2005 |
| 2009/0034455 | A1 | 2/2009 | Lee et al. | KR | 20050039376 A | 4/2005 |
| 2009/0103507 | A1 | 4/2009 | Gu et al. | KR | 1020050099633 | 10/2005 |
| 2009/0106507 | A1 | 4/2009 | Skerlj et al. | KR | 1020050121274 | 12/2005 |
| 2010/0220626 | A1 | 9/2010 | Das et al. | KR | 20060012282 A | 2/2006 |
| 2011/0090812 | A1 | 4/2011 | Aoyama | RU | 2149518 | 5/2000 |
| 2011/0149789 | A1 | 6/2011 | Edge | RU | 2181529 | 4/2002 |
| | | | | RU | 2188506 | 8/2002 |

FOREIGN PATENT DOCUMENTS

| | | | | | |
|---|---|---|---|---|---|
| | | | | RU | 2202154 | 4/2003 |
| CN | 1507708 | | 6/2004 | TW | 200423642 | 11/2004 |
| CN | 1545252 | A | 11/2004 | WO | WO9623371 | 8/1996 |
| CN | 1604685 | | 4/2005 | WO | WO9845967 A2 | 10/1998 |
| DE | 10162564 | A1 | 7/2003 | WO | WO9856120 A2 | 12/1998 |
| EP | 1037419 | A2 | 9/2000 | WO | WO9913600 A1 | 3/1999 |
| EP | 1037491 | A1 | 9/2000 | WO | WO9959254 A2 | 11/1999 |
| EP | 1054518 | A1 | 11/2000 | WO | WO0101610 A1 | 1/2001 |
| EP | 1179962 | | 2/2002 | WO | WO0135548 | 5/2001 |
| EP | 1180881 | | 2/2002 | WO | WO0182504 | 11/2001 |
| EP | 1180907 | A2 | 2/2002 | WO | 0233841 | 4/2002 |
| EP | 1233637 | | 8/2002 | WO | WO0232183 A1 | 4/2002 |
| EP | 1377100 | A2 | 1/2004 | WO | WO0239760 A2 | 5/2002 |
| EP | 1511245 | A2 | 3/2005 | WO | WO0249305 | 6/2002 |
| EP | 1564953 | A2 | 8/2005 | WO | WO02073831 A | 9/2002 |
| EP | 1594260 | A1 | 11/2005 | WO | 02104058 | 12/2002 |
| EP | 1758276 | A1 | 2/2007 | WO | WO02101941 A2 | 12/2002 |
| GB | 2340693 | | 2/2000 | WO | WO03094544 A1 | 11/2003 |
| JP | 8008806 | | 1/1996 | WO | WO03105498 A1 | 12/2003 |
| JP | 8503591 | | 4/1996 | WO | WO2004077685 A2 | 9/2004 |
| JP | 9275582 | A | 10/1997 | WO | WO2004084452 | 9/2004 |
| JP | 09307939 | | 11/1997 | WO | WO2004084503 A2 | 9/2004 |
| JP | 10022975 | A | 1/1998 | WO | WO2004100450 A1 | 11/2004 |
| JP | 10173585 | | 6/1998 | WO | WO2004105420 A1 | 12/2004 |
| JP | 11122167 | | 6/1998 | WO | WO2004110081 A1 | 12/2004 |
| JP | 2000049689 | | 2/2000 | WO | 2005020490 | 3/2005 |
| JP | 2001007761 | | 1/2001 | WO | WO2005034438 | 4/2005 |
| JP | 2001016152 | | 1/2001 | WO | 2005060271 | 6/2005 |
| JP | 2001510974 | | 8/2001 | WO | WO 2005/060277 | 6/2005 |
| JP | 2001512921 | T | 8/2001 | WO | WO2005057812 A1 | 6/2005 |
| JP | 2001251680 | A | 9/2001 | WO | WO2005060132 A1 | 6/2005 |
| JP | 2001523901 | T | 11/2001 | WO | WO2005060277 A2 | 6/2005 |
| JP | 2001525135 | T | 12/2001 | WO | WO2005065056 A2 | 7/2005 |
| JP | 2002077992 | | 3/2002 | WO | WO2005069519 | 7/2005 |
| JP | 2002111627 | A | 4/2002 | WO | WO2005125049 | 12/2005 |
| JP | 2002262330 | A | 9/2002 | WO | 2006044718 | 4/2006 |
| JP | 2003018641 | A | 1/2003 | WO | WO2006075293 A1 | 7/2006 |
| JP | 2003500911 | | 1/2003 | WO | WO2007031956 A2 | 3/2007 |
| JP | 2003509983 | A | 3/2003 | | | |
| JP | 2003510887 | | 3/2003 | | | |
| JP | 2003244161 | | 8/2003 | | | |

OTHER PUBLICATIONS

International Preliminary Report on Patentability PCT/US2005/037115, IP WIPO, Switzerland, Apr. 17, 2007.

International Search Authority PCT/US2006/040204, International Search Authority European Patent Office Apr. 2, 2007.

International Preliminary Report on Patentability PCT/US2006/040204, IB WIPO Apr. 16, 2008.

Written Opinion PCT/US2006/040204, International Search Authority European Patent Office Apr. 14, 2008.
International Search Report PCT/US2006/040205 International Search Authority European Patent Office Apr. 2, 2007.
International Preliminary Report on Patentability PCT/US2006/040205 IB-WIPO, Switzerland, Apr. 16, 2008.
Written Opinion PCT/US2006/040205 International Search Authority European Patent Office Apr. 16, 2008.
International Search Report PCT/US07/080852, International Search Authority European Patent Office Feb. 20, 2008.
International Search Report PCT/US2006/040542, International Search Authority European Patent Office Mar. 29, 2007.
International Preliminary Report on Patentability PCT/US2006/040542, IB WIPO Apr. 16, 2008.
Written Opinion PCT/US2006/040542, International Search Authority European Patent Office Mar. 29, 2007.
International Search Report PCT/US2006/040543, International Search Authority European Patent Office Mar. 29, 2007.
International Preliminary Report on Patentability PCT/US2006/040543, IB of WIPO Switzerland, Apr. 16, 2008.
Written Opinion PCT/US2006/040543, International Search Authority European Patent office Mar. 29, 2007.
International Search Report for PCT/US05/37115, 3 pages, dated Sep. 26, 2006.
Written Opinion of the International Searching Authority for PCT/US05/37115, 6 pages, dated Sep. 26, 2006.
Hosein, et al., "Optimal Assignment of Mobile Station Serving Sector for the Forward Link of a Time-Shared Wireless Packet Data Channel," Fifth IEE international Conference on 3G Mobile Communication Technologies (3G 2004), Oct. 18-20, 2004 pp. 654-658.
Kwon, et al., "Quasi-Dedicated Access Scheme for Uplink Realtime Services in Future Wireless Communication Systems," Vehicular Technology Conference, 2005. VTC 2005 Spring. 2005 IEEE 61st Stockholm, Sweden, Apr. 20-May 1, 2005, Piscataway, NJ, USA, May 30, 2005. pp. 3117-3121.
Majmundar. "Impact of Mobile-Originated Short Message Service on the Digital Control Channel of TDMA Systems," Vehicular Technology Conference, 2000. IEEE VTS Fall VTC 2000. 52nd Sep. 24-28, 2000, Piscataway, NJ, USA, IEEE, Sep. 24, 2000, pp. 1550-1555.
Wada, "Study of an OFDM Cellular System Using a Single Band," 2002 Communication Society Convention, Collection of Lecture Papers 1, Japan, IEEE, Aug. 20, 2002, p. 355, B-5-58.
IEEE P802.16e/D5: "Draft IEEE Standard for Local and metropolitan area networks, Part 16: Air Interface for Fixed and Mobile Broadband Wireless Access Systems Amendment for Physical and Medium Access Control Layers for Combined Fixed and Mobile Operation in Licensed Bands", pp. 1-356, Sep. 2004.
IEEE P802.16e/D5: "Draft IEEE Standard for Local and metropolitan area networks, Part 16: Air Interface for Fixed and Mobile Access Control Layers for Combined Fixed and Mobile Operation in Licensed Bands", pp. 184-190, Sep. 2004.
Hang Zhang et al, "Clean up for Closed-Loop MIMO in H-ARQ MAP IE", IEEE P802.16e/D7 Broadband Wireless Access Control Working Group <http://ieee802.org/16>, pp. 1-6, Mar. 10, 2010.
Supplementary European Search Report—EP04713438, Search Authority—The Hague Patent Office, Nov. 30, 2010.
Translation of Office Action in Ukraine application 200508984 corresponding to U.S. Appl. No. 11/748,433, dated Dec. 9, 2010.
Translation of Office Action in Ukraine Application 2010-10406 corresponding to U.S. Appl. No. 11/748,433, dated Feb. 22, 2011.

3GPP: ETSI TS 125 331 V6.3.0: Radio Resource Control (RRC) protocol specification (3GPP TS 25.331 version 6.3.0 Release 6), ETSI TS 125 331, Sep. 1, 2004, pp. 49, 202-209, 220, 221, 406, 579-585, 589, 930.
Ericsson: Discussion on SIR Measurement, TSG-RAN Working Group 4 (Radio) meeting #18, Berlin, Germany, 3GPP TS 25.101 V3.7.0, Jul. 9, 2001, R4-010895, URL: http://www.3gpp.org/ftp/tsg_ran/WG4_Radio/TSGR4_18/Docs/R4-010895.zip.
European Search Report—EP11159855—Search Authority—Berlin—Apr. 26, 2011.
TIM/TILAB, Blu, Mobilkom Austria, One2one,Telefonica: Re-introduction of SIR measurement, 3GPP TSG-RAN4 Meeting #17,3GPP, May 21, 2001, R4-010647, URL: http://www.3gpp.org/ftp/tsg_ran/WG4_Radio/TSGR4_17/Docs/R4-010647.Zip.
Translation of Office Action in Chinese application 200680047991.2 corresponding to U.S. Appl. No. 11/608,785, dated Dec. 31, 2010.
Translation of Office Action in Japan application 2008-535788 corresponding to U.S. Appl. No. 11/549,604, dated Jan. 4, 2011.
Translation of Office Action in Japan application 2008-547460 corresponding to U.S. Appl. 11/333,771, dated Mar. 15, 2011.
Translation of Office Action in Japan application 2010-275603 corresponding to U.S. Appl. 11/251,069, dated Feb. 8, 2011.
Translation of Office Action in Japanese application 2008-535738 corresponding to U.S. Appl. No. 11/486,714, dated Nov. 16, 2010.
Translation of Office Action in Japanese application 2008-535789 corresponding to U.S. Appl. No. 11/549,611, dated Jan. 18, 2011.
3GPP TSG RAN2#45bis. "EDCH Buffer Status Reporting," R2-050026, Sophia Antipolis, France, Jan. 10-14, 2005, URL: http://www.3gpp.org/ftp/tsg_ran/WG2_RL2/TSGR2_45bis/Dcs/R2-050026.zip.
3GPP TSG-RAN WG2 meeting #48. "Scheduling Information Contents," R2-051957, London, United Kingdom, Aug. 29, 2005, URL: http://3gpp.org/ftp/tsg_ran/WG2_RL2/TSGR2_48/Docments/R2-095517.zip.
Chang, Cheng-Ta: "Downlink Transmit Power Issues in a WCDMA Cellular System,"Dec. 14, 2004, p. 3, FIG. 1, Retrieved online: http://wintech.ee.nctu.edu.tw/handoff/MediaTek/Material/Wintech/1214/Downlink%20Tran smit%20Power%20Issues%20in%20a%20WCDMA%20Cellular%20System.pdf.
Gunnarsson, G. et al.,"Location Trial System for Mobile Phones," Global Telecommunications Conference, 1998. GLOBECOM 98. The Bridge to Global Integration. IEEE, vol. 4, pp. 2211-2216, Nov. 8-12, 1998.
Hobfeld, T. et al., "Supporting Vertical Handover by Using a Pastry Peer-to-Peer Overlay Network," Fourth Annual IEEE International Conference on Pervasive Computing and Communications Workshops, 2006. PERCOM Workshops 2006. Mar. 13-17, 2006, pp. 163-167, p. 164, paragraph III, IEEE, Piscataway, NJ, USA, XP010910514, ISBN: 0-7695-2520-2.
LG Electronics Inc., "Relative Buffer Status Reporting," 3GPP TSG-RAN WG2 meeting #46bis, R2-050852, Apr. 4, 2005, pp. 1-3, URL, http://www.3gpp.org/ftp/tsg_ran/WG2_RL2/TSGR2_46bis/Documents/R2-050852.zip.
Samsung: "Uplink control signaling structure (Revision of R1-041086)," 3GPP TSG-RAN WG1 Meeting #38bis, Tdoc R1-041222, 3GPP, Sep. 20, 2004, URL: http://www.3gpp.org/ftp/tsg_ran/WG1_RL1/TSGR1_38bis/Dcs/R1-041222.zip.
Taiwan Search Report—TW095148233—TIPO—Oct. 19, 2012.

* cited by examiner

METHODS AND APPARATUS FOR DETERMINING, COMMUNICATING AND USING INFORMATION WHICH CAN BE USED FOR INTERFERENCE CONTROL PURPOSES

RELATED APPLICATIONS

This application is a continuation-in-part of pending U.S. patent application Ser. No. 10/648,767 filed Aug. 25, 2003, which claims the benefit of U.S. Provisional Patent Application Ser. No. 60/449,729, filed Feb. 24, 2003, and the present application also claims the benefit of U.S. Provisional Patent Application Ser. No. 60/618,773, filed Oct. 14, 2004, titled "Methods and Apparatus for Uplink Interference Control in Wireless Systems" which is hereby expressly incorporated by reference.

FIELD OF THE INVENTION

The present invention relates to wireless communications system and, more particularly, to method and apparatus for collecting, measuring, reporting and/or using information which can be used for interference control purposes in a wireless communications system.

BACKGROUND

In a wireless multiple access communication system, wireless terminals contend for system resources in order to communicate with a common receiver over an uplink channel. An example of this situation is the uplink channel in a cellular wireless system, in which wireless terminals transmit to a base station receiver. When a wireless terminal transmits on the uplink channel, it typically causes interference to the entire system, e.g., neighboring base station receivers. Since wireless terminals are distributed, controlling the interference generated by their transmission is a challenging problem.

Many cellular wireless systems adopt simple strategies to control uplink interference. For example CDMA voice systems (e.g., IS-95) simply power control wireless terminals in such a manner that their signals are received at the base station receiver at approximately the same power. State-of-the-art CDMA systems such as 1×RTT and 1×EV-DO allow for wireless terminals to transmit at different rates, and be received at the base station at different powers. However, interference is controlled in a distributed manner which lowers the overall level of interference without precisely controlling those wireless terminals that are the worst sources of interference in the system.

This existing body of interference-control approaches limits the uplink capacity of wireless systems.

It would be useful if a base station could be provided with information that could be used in determining the amount of signal interference that will be created in neighboring cells when a transmission occurs and/or the amount of interference a wireless terminal is likely to encounter due to signal interference. It would be particularly desirable if information which can be used for interference determination purposes could be supplied by one or more wireless terminals to a base station.

SUMMARY

Figure 1:
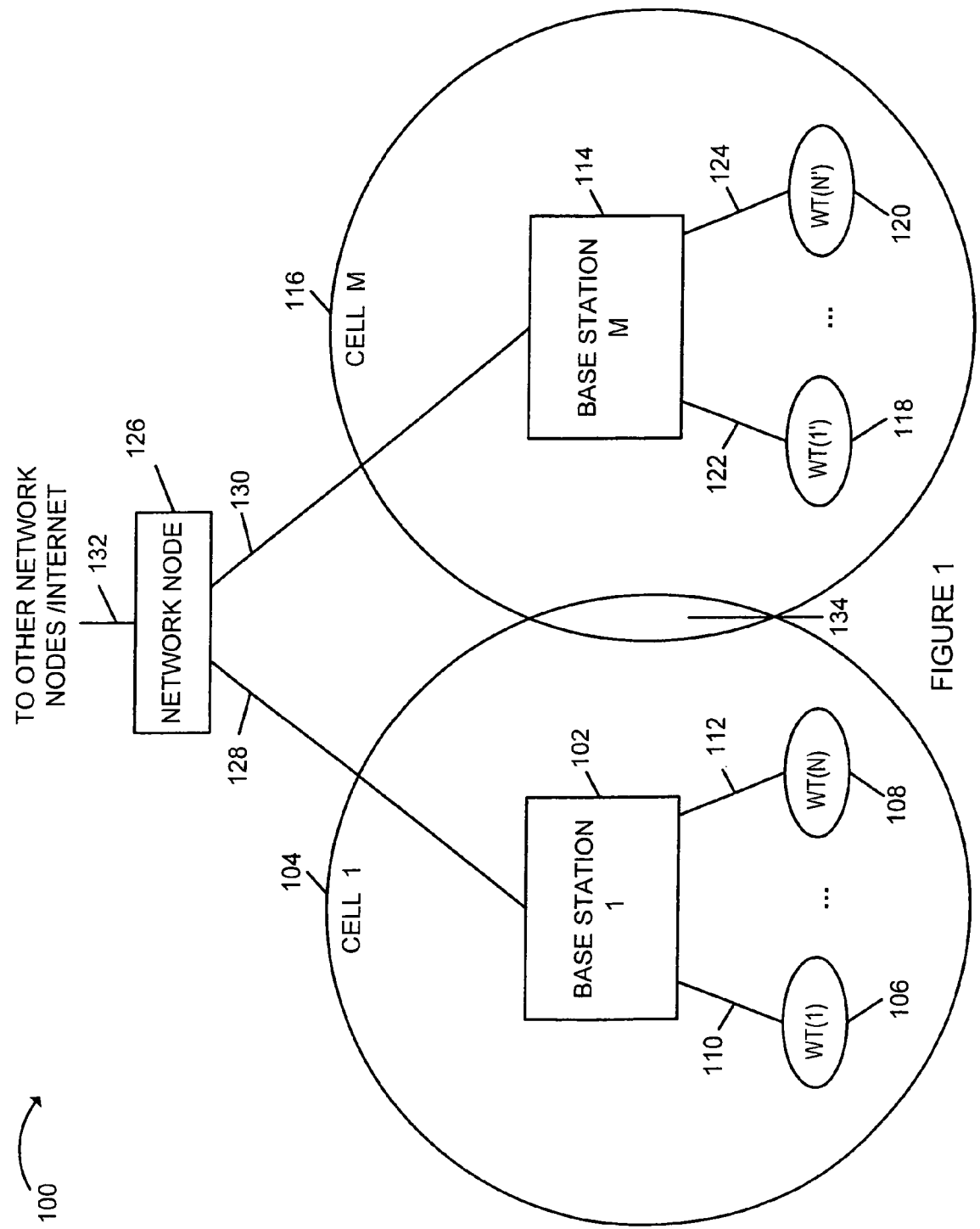
FIG. 1 is a drawing of an exemplary wireless communications system implemented in accordance with the present invention.

The present invention is directed to methods and apparatus for collecting, measuring, reporting and/or using information which can be used for interference control purposes.

In accordance with the invention, wireless terminals, e.g., mobile nodes, measure signals transmitted from one or more base stations, e.g., base station sector transmitters. The measured signals may be, e.g., beacon signals and/or pilot signals. The beacon signals may be narrowband signals, e.g., a single tone. The beacon signals may have a duration of one, two or more symbol transmission time periods. However, other types of beacon signals may be used and the particular type of beacon signal is not critical to the invention. From the measured signals, the wireless terminal generates one or more gain ratios which provide information about the relative gain of the communications channels from different base station sectors to the wireless terminal. This information represents interference information since it provides information about the signal interference that will be caused by transmissions to other base station sectors relative to transmissions made to the base station sector to which the wireless terminal is attached.

Based on the signal energy measurements and relative gains generated from the energy measures, reports are generated in accordance with the invention and sent to one or more base stations. The reports may be in a plurality of different formats and may provide information about the interference from one interfering base station or the interference caused by multiple interfering base stations. One format provides information about the interference which is caused be a single interfering base station sector transmitter relative to a base station sector to which the wireless terminal is connected. A base station may request from a wireless terminal a transmission of an interference report providing interference about a specific base station sector. This is done by the base station transmitting a request for a specific interference report to the wireless terminal. The request normally identifies the interfering BS sector for which the report is sought. The wireless terminal will respond to such a request by transmitting the requested report.

In addition to responding to requests for specific interference reports, wireless terminals, in some embodiments, transmit interference reports generated in accordance with the invention according to a reporting schedule. In such embodiments, a base station having an active connection with a wireless terminal will receive interference reports on a predictable, e.g., predetermined, schedule.

Depending on the embodiment, generation of gain ratios and/or reports may be a function of various factors indicative of relative transmission power levels used by different base station sectors and/or for different signals which may be measured. In this manner, signals which are transmitted at different power levels, e.g., pilots and beacon signals, can be measured and used in generating reliable relative channel gain estimates by taking into consideration the different relative transmission power levels of the various signals being measured.

Numerous additional features, benefits and embodiments are described in the detailed description which follows.

DETAILED DESCRIPTION

Methods and apparatus for collecting, reporting and using information which can be used for interference control purposes in accordance with the present invention will now be described. The methods and apparatus of the present invention are well suited for use with wireless multiple access, e.g., multi-user, communications systems. Such systems may be implemented as OFDM systems, CDMA systems or other types of wireless systems where signal interference from transmission from one or more transmitters, e.g., adjacent base stations, is of concern.

An exemplary embodiment of the invention is described below in the context of a cellular wireless data communication system 100 of the present invention shown in FIG. 1. While an exemplary cellular wireless system is used for purposes of explaining the invention, the invention is broader in scope than the example and can be applied in general to many other wireless communication systems as well.

In a wireless data communication system, the air link resource generally includes bandwidth, time or code. The air link resource that transports user data and/or voice traffic is called the traffic channel. Data is communicated over the traffic channel in traffic channel segments (traffic segments for short). Traffic segments may serve as the basic or minimum units of the available traffic channel resources. Downlink traffic segments transport data traffic from the base station to the wireless terminals, while uplink traffic segments transport data traffic from the wireless terminals to the base station. One exemplary system in which the present invention may be used is the spread spectrum OFDM (orthogonal frequency division multiplexing) multiple-access system in which, a traffic segment includes a number of frequency tones defined over a finite time interval.

FIG. 1 is an illustration of an exemplary wireless communications system 100, implemented in accordance with the present invention. Exemplary wireless communications system 100 includes a plurality of base stations (BSs): base station 1 102, base station M 114. Cell 1 104 is the wireless coverage area for base station 1 102. BS 1 102 communicates with a plurality of wireless terminals (WTs): WT(1) 106, WT(N) 108 located within cell 1 104. WT(1) 106, WT(N) 108 are coupled to BS 1 102 via wireless links 110, 112, respectively. Similarly, Cell M 116 is the wireless coverage area for base station M 114. BS M 114 communicates with a plurality of wireless terminals (WTs): WT(1') 118, WT(N') 120 located within cell M 116. WT(1') 118, WT(N') 120 are coupled to BS M 114 via wireless links 122, 124, respectively. WTs (106, 108, 118, 120) may be mobile and/or stationary wireless communication devices. Mobile WTs, sometimes referred to as mobile nodes (MNs), may move throughout the system 100 and may communicate with the base station corresponding to the cell in which they are located. Region 134 is a boundary region between cell 1 104 and cell M 116. In the FIG. 1 system, the cells are shown as single sector cells. Multi-sectors cells are also possible and are supported. The transmitter of a base station sector can be identified based on transmitted information, e.g., beacon signals, which communicate a base station identifier and/or sector identifier.

Network node 126 is coupled to BS 1 102 and BS M 114 via network links 128, 130, respectively. Network node 126 is also coupled to other network nodes/Internet via network link 132. Network links 128, 130, 132 may be, e.g., fiber optic links. Network node 126, e.g., a router node, provides connectivity for WTs, e.g., WT(1) 106 to other nodes, e.g., other base stations, AAA server nodes, Home agents nodes, communication peers, e.g., WT(N'), 120, etc., located outside its currently located cell, e.g., cell 1 104.

Figure 2:
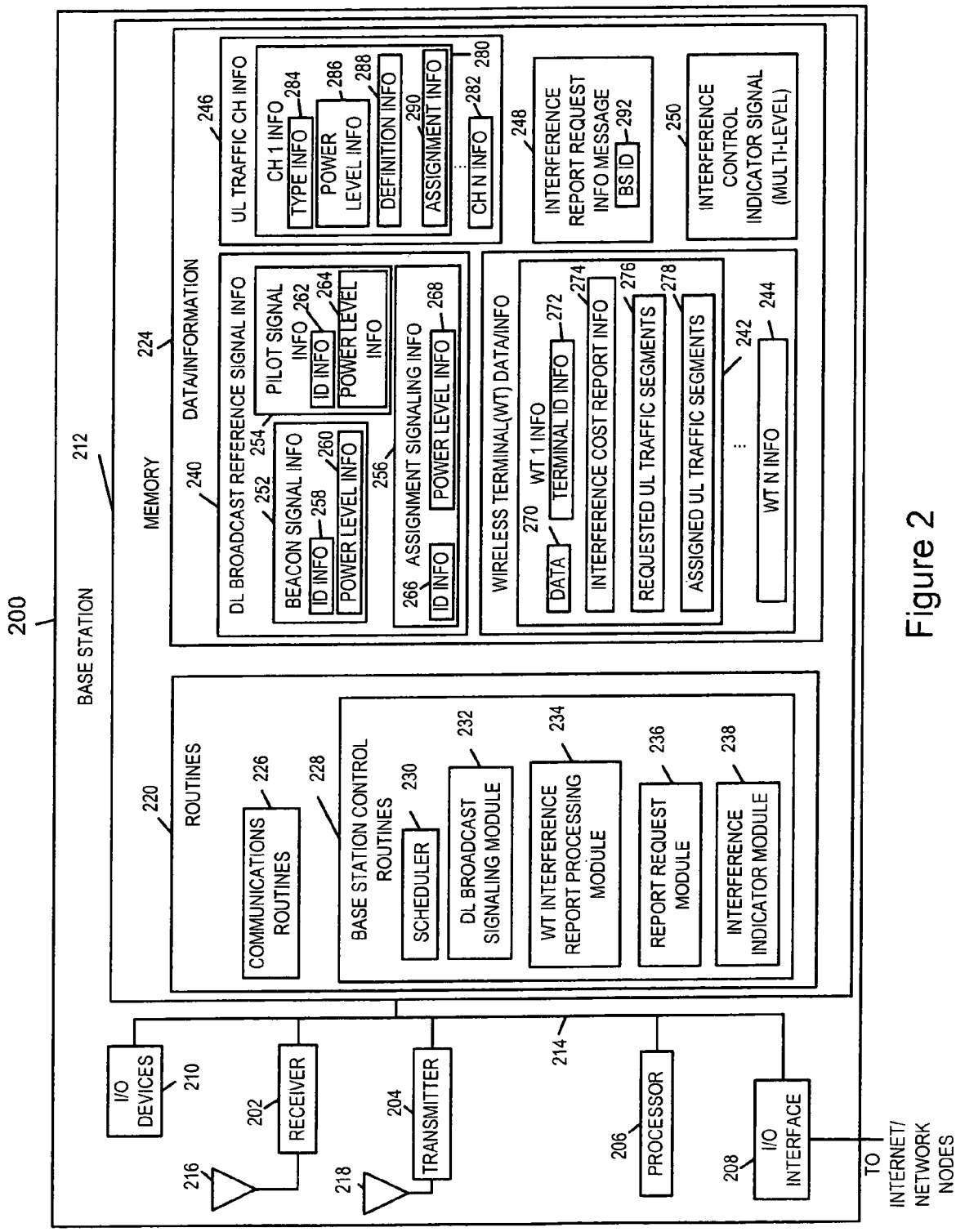
FIG. 2 shows an example of a base station implemented in accordance with the present invention.

FIG. 2 illustrates an exemplary base station 200, implemented in accordance with the present invention. Exemplary BS 200 may be a more detailed representation of any of the BSs, BS 1 102, BS M 114 of FIG. 1. BS 200 includes a receiver 202, a transmitter 204, a processor, e.g., CPU, 206, an I/O interface 208, I/O devices 210, and a memory 212 coupled together via a bus 214 over which the various elements may interchange data and information. In addition, the base station 200 includes a receiver antenna 216 which is coupled to the receiver 202 and a transmitter antenna 218 which is coupled to transmitter 218. Transmitter antenna 218 is used for transmitting information, e.g., downlink traffic channel signals, beacon signals, pilot signals, assignment signals, interference report request messages, interference control indicator signals, etc., from BS 200 to WTs 300 (see FIG. 3) while receiver antenna 216 is used for receiving information, e.g., uplink traffic channel signals, WT requests for resources, WT interference reports, etc., from WTs 300.

The memory 212 includes routines 220 and data/information 224. The processor 206 executes the routines 220 and uses the data/information 224 stored in memory 212 to control the overall operation of the base station 200 and implement the methods of the present invention. I/O devices 210, e.g., displays, printers, keyboards, etc., display system information to a base station administrator and receive control and/or management input from the administrator. I/O interface 208 couples the base station 200 to a computer network, other network nodes, other base stations 200, and/or the Internet. Thus, via I/O interface 308 base stations 200 may exchange customer information and other data as well as synchronize the transmission of signals to WTs 300 if desired. In addition I/O interface 208 provides a high speed connection to the Internet allowing WT 300 users to receive and/or transmit information over the Internet via the base station 300. Receiver 202 processes signals received via receiver antenna 216 and extracts from the received signals the information content included therein. The extracted information, e.g., data and channel interference report information, is communicated to the processor 206 and stored in memory 212 via bus 214. Transmitter 204 transmits information, e.g., data, beacon signals, pilot signals, assignment signals, interference report request messages, interference control indicator signals, to WTs 300 via antenna 318.

As mentioned above, the processor 206 controls the operation of the base station 200 under direction of routines 220 stored in memory 212. Routines 220 include communications routines 226, and base station control routines 228. The base station control routines 228 include a scheduler 230, a downlink broadcast signaling module 232, a WT report processing module 234, a report request module 236, and an interference indicator module 238. The report request module 236 can generate requests for specific interference reports concerning a particular BS sector identified in the report request. Generated report requests are transmitted to one or more wireless terminals when the BS seeks interference information at a time other than that provided for by a predetermined or fixed reporting schedule. Data/Information 224 includes downlink broadcast reference signal information 240, wireless terminal data/information 241, uplink traffic channel information 246, interference report request information messages 248, and interference control indicator signals 250.

Downlink broadcast reference signal information 240 includes beacon signal information 252, pilot signal information 254, and assignment signal information 256. Beacon signals are relatively high power OFDM broadcast signals in which the transmitter power is concentrated on one or a few tones for a short duration, e.g., one symbol time. Beacon signal information 252 includes identification information 258 and power level information 260. Beacon identification information 258 may include information used to identify and associate the beacon signal with specific BS 200, e.g., a specific tone or set of tones which comprise the beacon signal at a specific time in a repetitive downlink transmission interval or cycle. Beacon power level information 260 includes information defining the power level at which the beacon signal is transmitted. Pilot signals may include known signals broadcast to WTs at moderately high power levels, e.g., above ordinary signaling levels, which are typically used for identifying a base station, synchronizing with a base station, and obtaining a channel estimate. Pilot signal information 254 includes identification information 262 and power level information 264. Pilot identification information 262 includes information used to identify and associate the pilot signals with specific base station 200. Pilot power level information 264 includes information defining the power level at which the pilot signals are transmitted. Various signals providing information about signal transmission power levels, e.g., pilot and beacon signal transmission pilot levels, may be broadcast for use by wireless terminals in determining gain ratios and/or interference reports. Assignment signals includes broadcast uplink and downlink traffic channel segment assignment signals transmitted typically at power levels above ordinary signaling levels so as to reach WTs within its cell which have poor channel quality conditions. Assignment signaling information 256 includes identification information 266 and power level information 268. Assignment signaling identification information 266 includes information associating specific tones at specific times in the downlink timing cycle with assignments for the specific BS 200. Assignment power level information 268 includes information defining the power level at which the assignment signals are transmitted.

Wireless terminal data/information 240 includes a plurality of sets of WT data/information, WT 1 information 242, WT N info 244. WT 1 information 242 includes data 270, terminal identification information 272, interference cost report information 274, requested uplink traffic segments 276, and assigned uplink traffic segments 278. Data 270 includes user data associated with WT 1, e.g., data and information received from WT1 intended to be communicated by BS 200 either directly or indirectly to a peer node of WT1, e.g., WT N, in which WT 1 is participating in a communications session. Data 270 also includes received data and information originally sourced from a peer node of WT 1, e.g., WT N. Terminal identification information 272 includes a BS assigned identifier associating WT 1 used by the BS to identify WT 1. Interference cost report information 274 includes information which has been forwarded in a feedback report from WT 1 to BS 200 identifying interference costs of WT 1 transmitting uplink signaling to the communications system. Requested uplink traffic segments 276 include requests from WT1 for uplink traffic segments which are allocated by the BS scheduler 230, e.g., number, type, and/or time constraint information. Assigned uplink traffic segments 278 includes information identifying the uplink traffic segments which have been assigned by the scheduler 230 to WT 1.

Uplink traffic channel information 246 includes a plurality of uplink traffic channel segment information sets including information on the segments that may be assigned by BS scheduler 230 to WTs requesting uplink air link resources. Uplink traffic channel information 246 includes channel segment 1 information 280 and channel segment N information 282. Channel segment 1 information 280 includes type information 284, power level information 286, definition information 288, and assignment information 290. Type information 284 includes information defining the characteristics of the segment 1, e.g., the frequency and time extent of the segment. For example, the BS may support multiple types of uplink segments, e.g., a segment with a large bandwidth but a short time durations and a segment with a small bandwidth but a long time duration. Power level information 286 includes information defining the specified power level at which the WT is to transmit when using uplink segment 1. Definition information 288 includes information defining specific frequencies or tones and specific times which constitute uplink traffic channel segment 1. Assignment information 290 includes assignment information associated with uplink traffic segment 1, e.g., the identifier of the WT being assigned the uplink traffic channel segment 1, a coding and/or a modulation scheme to be used in uplink traffic channel segment 1.

Interference report request information messages 248, used in some embodiments, are messages to be transmitted, e.g., as a broadcast messages or as messages directed to specific WTs. The by BS 200 may transmit to WTs 300 on a common control channel instructing the WTs to determine and report the interference information with respect to a particular base station transmitter, e.g., base station sector transmitter, in the communications system. Interference report request information messages 248 normally include base station transmitter identification information 292 which identifies the particular base station sector being currently designated for the interference report. As discussed above, some base stations are implemented as single sector base stations. Over time BS 200 may change base station identification information 292 to correspond to each of the neighboring transmitters and thereby obtain interference information about multiple neighbors.

Interference control indicator signals 250, used in some embodiments, e.g., where at least some of the uplink traffic segments are not explicitly assigned by the base station, are signals broadcast by BS 200 to WTs 300 to control, in terms of interference, which WTs may use uplink traffic segments. For example, a multi-level variable may be used where each level indicates how tightly the BS 200 would like to control interference. WTs 300 which receive this signal can use this signal in combination with their own measured interference to determine whether or not the WT 300 is allowed to use the uplink traffic segments being controlled.

Figure 3:
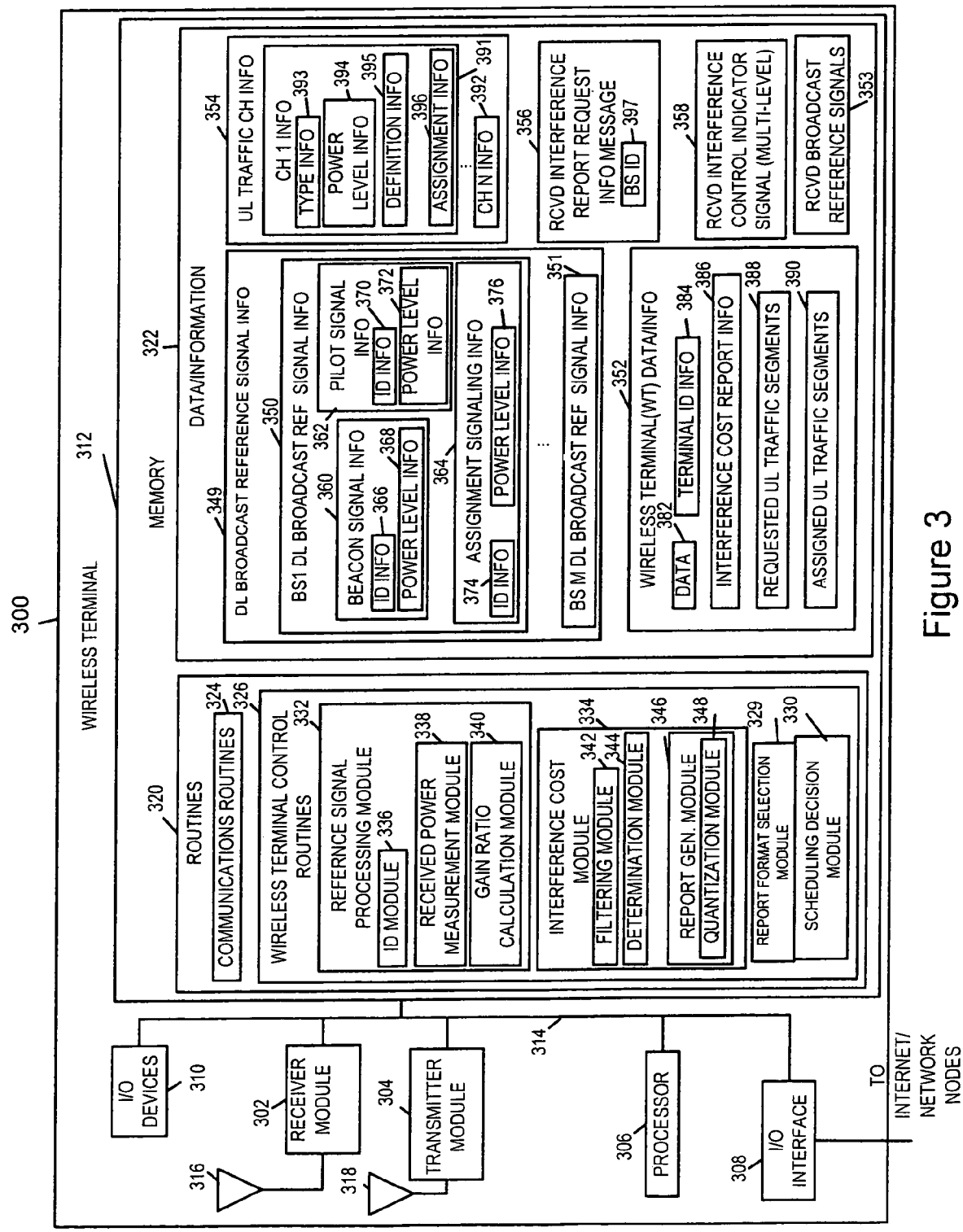
FIG. 3 illustrates a wireless terminal implemented in accordance with the present invention.

Communication routines 226 implement the various communications protocols used by the BS 200 and control overall transmission of user data. Base station control routines 228 control the operation of the I/O devices, I/O interface 208, receiver 202, transmitter 204, and controls the operation of the BS 200 to implement the methods of the present invention. Scheduler 230 allocates uplink traffic segments under its control to WTs 300 based upon a number of constraints: power requirement of the segment, transmit power capacity of the WT, and interference cost to the system. Thus, the scheduler 230 may, and often does, use information from received interference reports when scheduling downlink transmissions. Downlink broadcast signaling module 232 uses the data/information 2224 including the downlink broadcast reference signal information 240 to generate and transmits broadcast signals such as beacons, pilot signals, assignments signals, and/or other common control signal transmitted at known power levels which may be used by WTs 300 in determining downlink channel quality and uplink interference levels. WT interference report processing module 234 uses the data/information 240 including the interference cost report information 274 obtained from the WTs 300 to process, correlate, and forward uplink interference information to the scheduler 230. The report request module 236, used in some embodiments, generates a sequence of interference report request messages 248 to request a sequence of uplink interference reports, each report corresponding to one of its adjacent base stations. Interference indicator module 238, used in some embodiments, generates (multi-level) interference control indicator signals 250 which are transmitted to the WTs 300 to control access to some uplink traffic channel segments which a FIG. 3 illustrates an exemplary wireless terminal 300, implemented in accordance with the present invention. Exemplary wireless terminal 300 may be a more detailed representation of any of the WTs 106, 108, 118, 120 of exemplary system wireless communication system 100 of FIG. 1. WT 300 includes a receiver 302, a transmitter 304, I/O devices 310, a processor, e.g., a CPU, 306, and a memory 312 coupled together via bus 314 over which the various elements may interchange data and information. Receiver 302 is coupled to antenna 316; transmitter 304 is coupled to antenna 316.

Downlink signals transmitted from BS 200 are received through antenna 316, and processed by receiver 302. Transmitter 304 transmits uplink signals through antenna 318 to BS 200. Uplink signals includes, e.g., uplink traffic channel signals and interference cost reports. I/O devices 310 include user interface devices such as, e.g., microphones, speakers, video cameras, video displays, keyboard, printers, data terminal displays, etc. I/O devices 310 may be used to interface with the operator of WT 300, e.g., to allow the operator to enter user data, voice, and/or video directed to a peer node and allow the operator to view user data, voice, and/or video communicated from a peer node, e.g., another WT 300.

Memory 312 includes routines 320 and data/information 322. Processor 306 executes the routines 320 and uses the data/information 322 in memory 312 to control the basic operation of the WT 300 and to implement the methods of the present invention. Routines 320 include communications routine 324 and WT control routines 326. WT control routines 326 include a reference signal processing module 332, an interference cost module 334, and a scheduling decision module 330. Reference signal processing module 332 includes an identification module 336, a received power measurement module 338, and a channel gain ratio calculation module 340. Interference cost module 334 includes a filtering module 342, a determination module 344, and a report generation module 346. The report generation module 346 includes a quantization module 348.

Data/information 322 includes downlink broadcast reference signal information 349, wireless terminal data/information 352, uplink traffic channel information 354, receiver interference report request information message 356, received interference control indicator signal 358, and received broadcast reference signals 353.

Downlink broadcast reference signal information 349 includes a plurality of downlink broadcast reference signal information sets, base station 1 downlink broadcast reference signal information 350, base station M downlink broadcast reference signal information 351. BS 1 downlink broadcast reference signal information includes beacon signal information 360, pilot signal information 362, and assignment signaling information 364. Beacon signal information 360 includes identification information 366, e.g., BS identifier and sector identifier information, and power level information 368. Pilot signal information 362 includes identification information 370 and power level information 372. Assignment signaling information 364 includes identification information 374 and power level information 376.

Wireless terminal data/information 352 includes data 382, terminal identification information 384, interference report information 386, requested uplink traffic segments 388, and assigned uplink traffic segments 390.

Uplink traffic channel information 354 includes a plurality of uplink traffic channel information sets, channel 1 information, channel N information 392. Channel 1 information includes type information 393, power level information 394, definition information 395, and assignment information 396. The scheduling module 330 controls the scheduling of the transmission interference reports, e.g., according to a predetermined schedule, BS requested interference reports in response to received report requests, and user data.

Received interference report request information message 356 includes a base station identifier 397.

Figure 4:
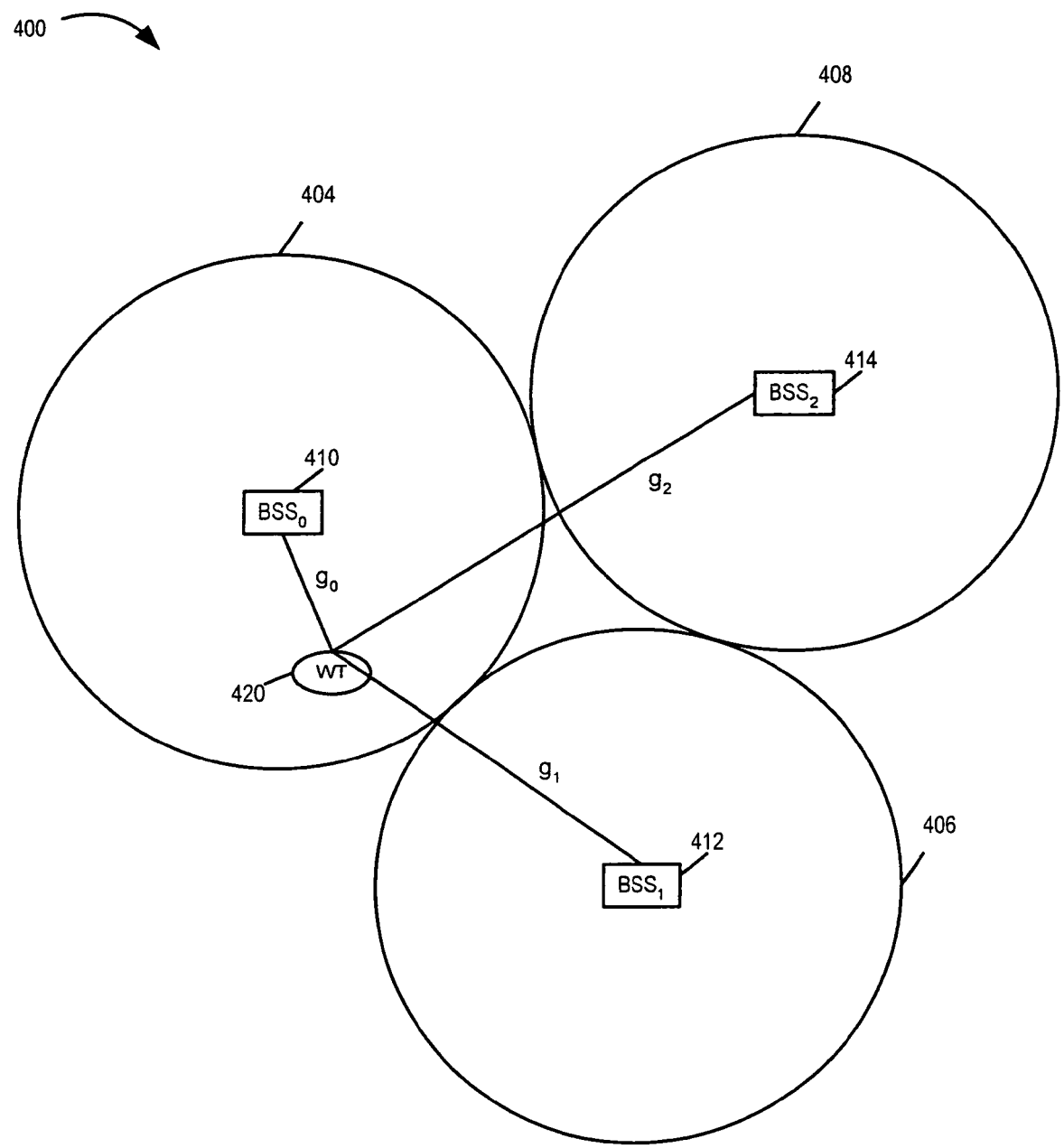
FIG. 4 illustrates a system in which a wireless terminal is connected to a base station sector and measures the relative gains associated with a plurality of interfering base stations in accordance with the invention.
Figure 5A:
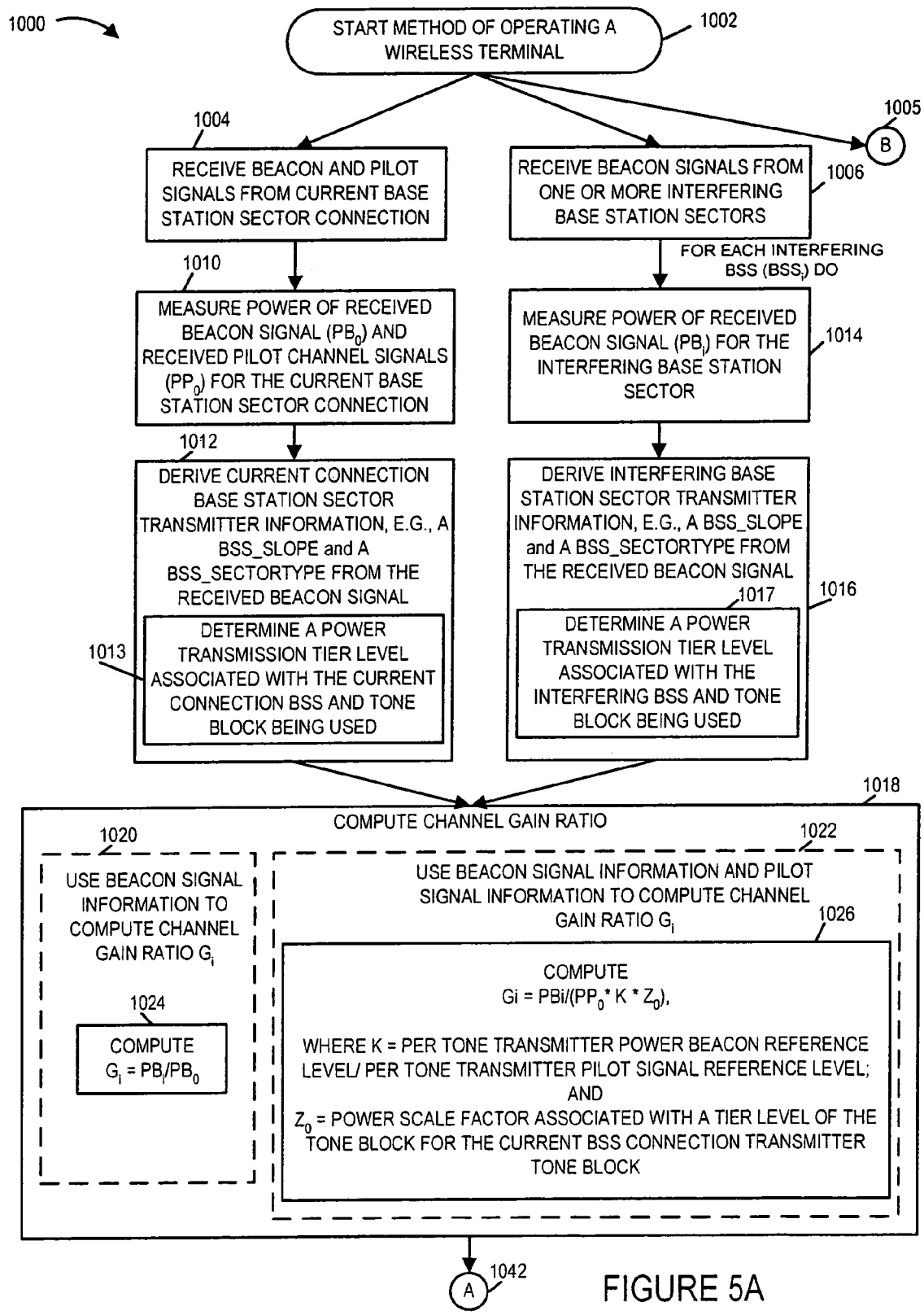
FIG. 5 is a flow chart illustrating a method of measuring signal energy, determining gains and providing interference reports in accordance with the invention.
Figure 5B:
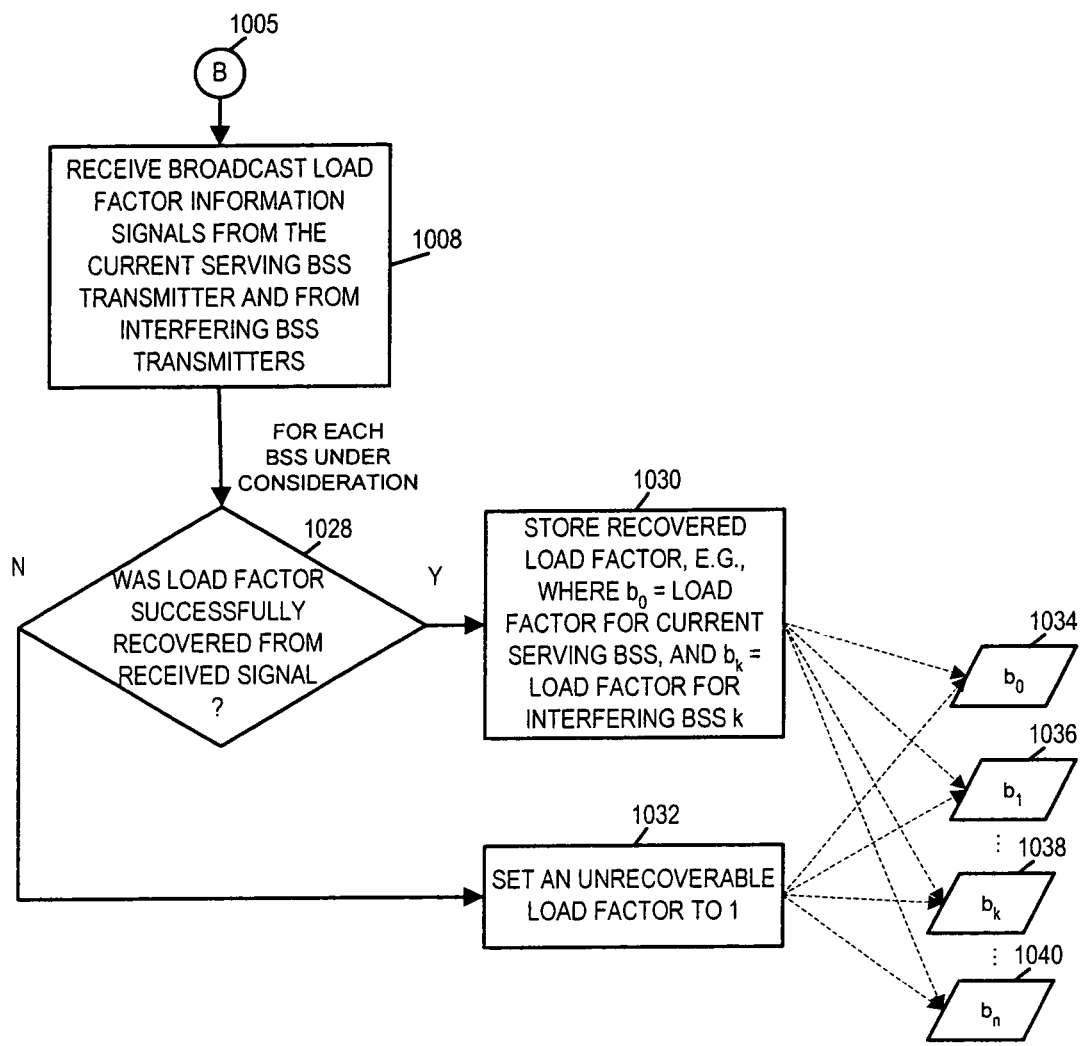
Figures 5, 5A, 5B, 5C:
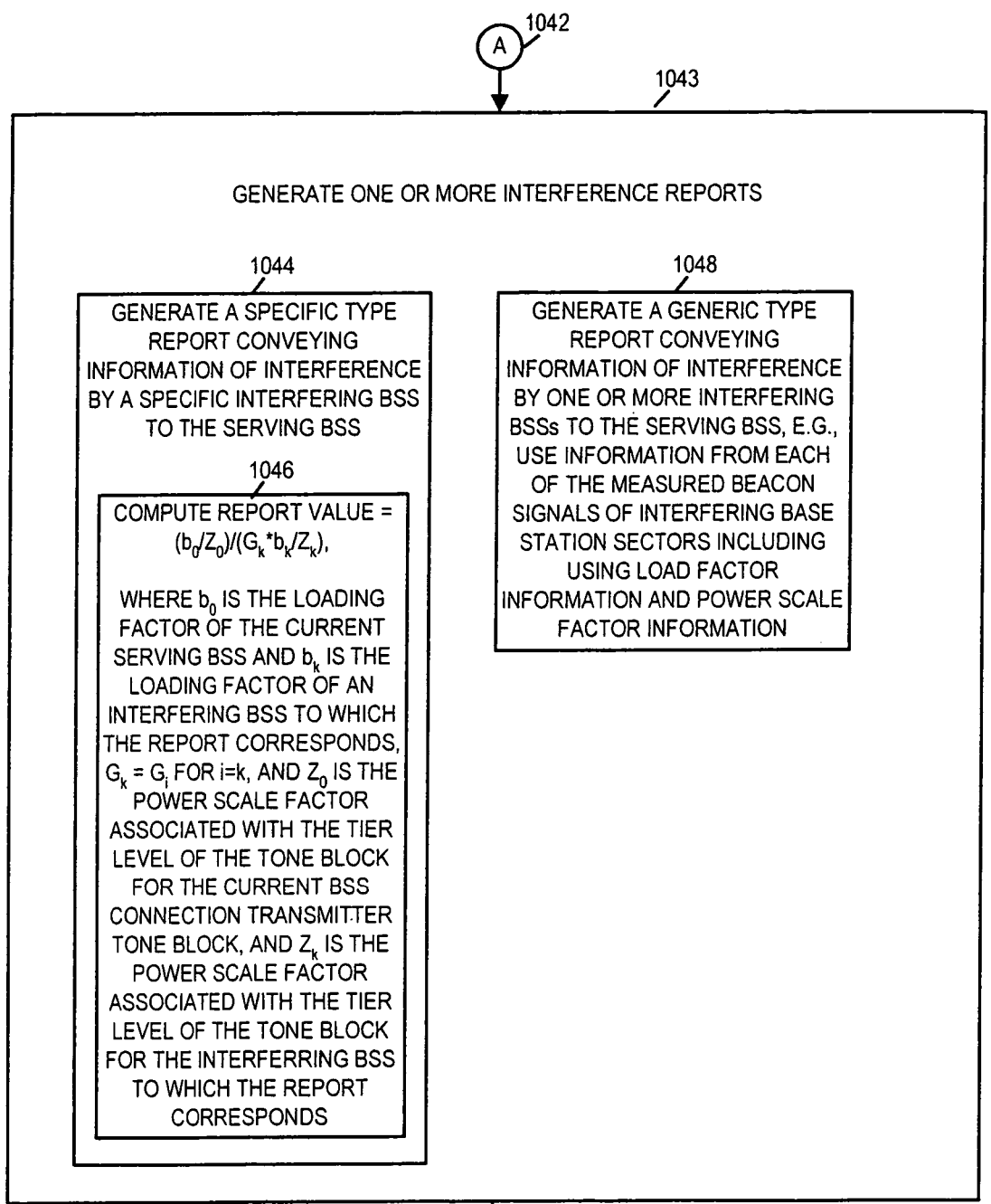

FIG. 4 illustrates an exemplary system 400 implemented in accordance with the invention which will be used to explain various features of the invention. The system 400 includes first, second and third cells 404, 406, 408 which neighbor each other. The first cell 404 includes a first base station including a first base station sector transmitter ($BSS_0$) 410 and a wireless terminal 420 which is connected to $BSS_0$ 410. The second cell 406 includes a station base station including a second base station sector transmitter ($BSS_1$) 412. The third cell 408 includes a third station base station including a third base station sector transmitter ($BSS_2$) 414. As can be seen, signals transmitted between $BSS_0$ and the WT 420 are subjected to a channel gain $g_0$. Signals transmitted between $BSS_1$ and the WT 420 are subjected to a channel gain $g_1$. Signals transmitted between $BSS_2$ and the WT 420 are subjected to a channel gain $g_2$.

Assume that the WT is connected to $BSS_0$ 410 using $BSS_0$ 410 as its attachment point. A gain ratio $G_i$=ratio of the channel gain from the BSSi to the WT to the channel gain from the $BSS_0$ to which the WT 420 is connected. That is:

$$G_i = g_i/g_0$$

Assuming that beacon signals are transmitted from the first, second and third BSSs at the same power level, the received power (PB) of the beacon signals received from the base stations $BSS_0$, $BSS_1$, $BSS_2$ can be used to determine the gain ratio's as follows:

$$G_0 = g_0/g_0 = 1 = PB_0/PB_0$$

$$G_1 = g_1/g_0 = 1 = PB_1/PB_0$$

$$G_2 = g_2/g_0 = 1 = PB_2/PB_0$$

Figure 6:
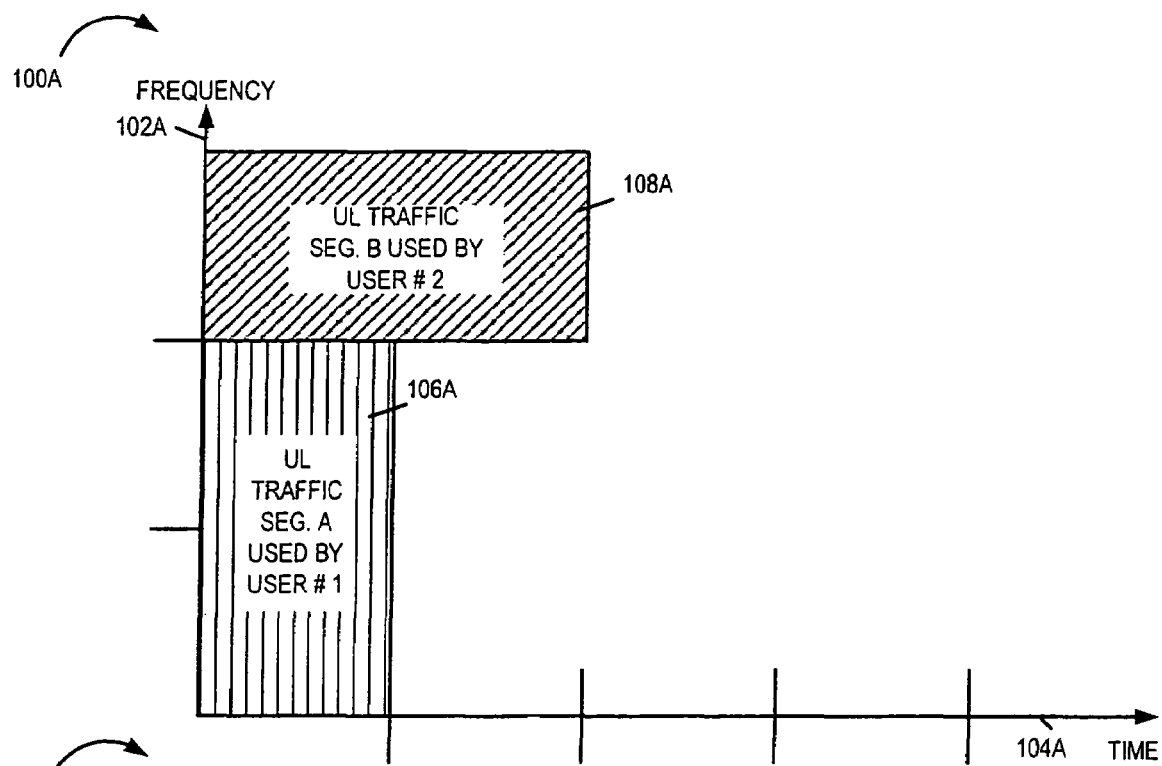
FIG. 6 illustrates an uplink traffic channel and segments included therein.

The following discussion of the invention will focus on the operation of the uplink traffic channel in accordance with the invention. In the exemplary system, the traffic segments that constitute the uplink traffic channel may be defined over different frequency and time extents in order to suit a broad class of wireless terminals that are operating over a diverse set of wireless channels and with different device constraints. FIG. 6 is a graph 100A of frequency on the vertical axis 102A vs time on the horizontal axis 104A. 6 illustrates two kinds of traffic segments in the uplink traffic channel. Traffic segment denoted A 106A occupies twice the frequency extent of the traffic segment denoted B 108A. The traffic segments in the uplink traffic channel can be shared dynamically among the wireless terminals that are communicating with the base station. A scheduling module that is part of the base station can rapidly assign the traffic channel segments to different users according to their traffic needs, device constraints and channel conditions, which may be time varying in general. The uplink traffic channel is thus effectively shared and dynamically allocated among different users on a segment-by-segment basis. The dynamic allocation of traffic segments is illustrated in FIG. 6A in which segment A is assigned to user #1 by the base station scheduler and segment B is assigned to user #2.

Figure 7:
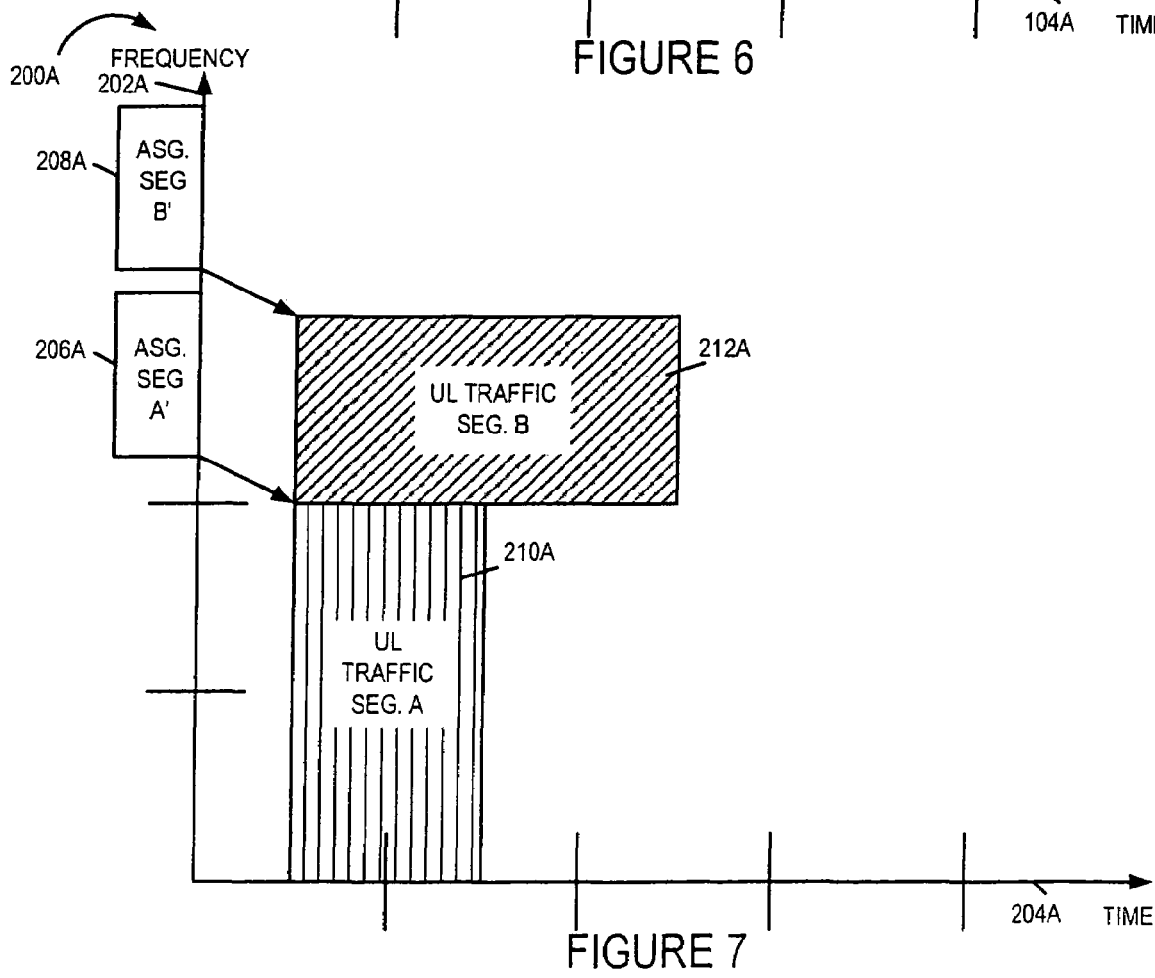
FIG. 7 illustrates assignments which can be used by a base station to assign uplink traffic channel segments to a wireless terminal.

In the exemplary system, the assignment information of traffic channel segments is transported in the assignment channel, which includes a series of assignment segments. Each traffic segment is associated with a corresponding unique assignment segment that conveys the assignment information that may include the identifier of the wireless terminal and also the coding and modulation scheme to be used in that traffic segment. FIG. 7 is a graph 200A of frequency on the vertical axis 202A vs. time on the horizontal axis 204A. FIG. 7 shows two assignment segments, A' 206A and B' 208A, which convey the assignment information of the uplink traffic segments A 210A and B 212A, respectively. The assignment channel is a shared channel resource. The wireless terminals receive the assignment information conveyed in the assignment channel and then transmit on the uplink traffic channel segments according to the assignment information.

The base station scheduler 230 allocates traffic segments based on a number of considerations. One constraint is that the transmit power requirement of the traffic channel should not exceed the transmit power capability of the wireless terminal. Hence, wireless terminals that are operating over weaker uplink channels may be allocated traffic segments that occupy a narrower frequency extent in the exemplary system in order that the instantaneous power requirements are not severely constraining. Similarly, wireless terminals that generate a greater amount of interference may also be allocated traffic segments that include a smaller frequency extent in order to reduce the impact of the instantaneous interference generated by them. In accordance with the invention, the total interference is controlled by scheduling the transmission of the wireless terminals on the basis of their interference costs to the system, which are defined in the following.

In accordance with the invention, the wireless terminals determine their interference costs to the system from the received downlink broadcast signals. In one embodiment, the wireless terminals report their interference costs to the base station, in the form of interference reports, which then makes uplink scheduling decisions to control uplink interference. In another embodiment, the base station broadcasts an interference control indicator, and the wireless terminals compare their interference costs with the received indicator to determine their uplink transmission resources in an appropriate manner, e.g., mobiles have uplink transmission costs below a level indicated by the control indicator may transmit while mobiles with interference costs exceeding the cost level indicated by the control indicator will refrain from transmitting.

Exemplary Interference costs which may be considered will now be described.

Consider a wireless terminal labeled $m_0$. Assume the wireless terminal is connected to base station $B_0$. Denote $G_{0,k}$ the channel gain between this wireless terminal and base station $B_k$, for k=0, 1, . . . , N−1, where N is the total number of base stations in the system.

In the exemplary system, the amount of power transmitted by wireless terminal 0 on the uplink traffic segment is usually a function of the condition of the wireless channel from wireless terminal $m_0$ to the base station $B_0$, the frequency extent, and the choice of code rate on the traffic segment. The frequency extent of the segment and the choice of code rate determine the transmit power used by the mobile, which is the quantity that directly causes interference. Assume that the SNR required for the base station receiver to decode the traffic segment necessitates a receive power $P_R$ per tone of the traffic segment (which is a function of the choice of code rate and the channel conditions over which the mobile terminal is operating). This is related to the transmit power per tone of the wireless terminal, $P_T$, as follows:

$$P_R = P_T G_{0,0}$$

The interference per tone produced by this wireless terminal at neighboring base station k can then be computed as follows:

$$P_{I,k} = P_T G_{0,k} = P_R \frac{G_{0,k}}{G_{0,0}}$$

Denote $$r_{0,k} = \frac{G_{0,k}}{G_{0,0}}.$$

From this expression, it is clear that the interference generated by wireless terminal $m_0$ at base station $B_k$ is proportional to its transmit power as well as the ratio of the channel gains to base station k and to its own base station. Hence, $r_{0,k}$ is called the interference cost of wireless terminal $m_0$ to base station $B_k$.

Generalizing this concept, the total interference per tone produced by a wireless terminal to all the neighboring base stations is $$P_I^{total} = P_T(G_{0,1} + G_{0,2} + \ldots + G_{0,N}) = P_R \frac{\sum_{k \neq 0}^{N} G_{0,k}}{G_{0,0}} = P_R \sum_{k=1}^{N} r_{0,k}$$

Therefore, $\{r_{0,1}, \ldots, r_{0,N}\}$ are the interference costs of wireless terminal 0 to the entire system.

It is useful to note that the aggregate instantaneous interference produced by the mobile $m_0$ to base station $B_k$ is actually given by $n_{tones} r_{0,k}$ where $n_{tones}$ is the frequency extent of the traffic segment.

Method of determining interference costs in some embodiments will now be described. In one exemplary embodiment, each base station 102, 114 in the exemplary system 100 broadcasts periodic reference signals at high power that the wireless terminals can detect and decode. The reference signals include beacons, pilots, or other common control signals. The reference signals may have a unique pattern that serves to identify the cell and the sector of the base station.

In the exemplary OFDM system 100, a beacon or pilot signal can be used as the reference signals. A beacon signal is a special OFDM symbol in which most of the transmission power is concentrated on a small number of tones. The frequency location of those high-power tones indicates the identifier of the base station. A pilot signal can have a special hopping pattern, which also uniquely specifies the identifier of the base station 102. Thus, a base station sector can be identified in the exemplary system from beacon and/or pilot signals.

In a CDMA system, a pilot signal can be used as the reference signal. In the IS-95 system, for example, a pilot is a known spreading sequence with a particular time offset as the identifier of the base station.

While the exemplary system 100 described above uses beacon or pilot signals to provide a reference signal for path loss estimation, the invention is applicable in a wide variety of systems that may use other techniques to provide reference signals.

The reference signals are transmitted at known powers. Different reference signals may be transmitted at different powers. Different base stations 102, 114 may use different power levels for the same type of reference signals as long as these powers are known to the mobile terminals.

The wireless terminal 106 first receives the reference signals to get the identifier of the base station 102. Then, the wireless terminal 106 measures the received power of the reference signals, and calculates the channel gain from the base station 102 to the wireless terminal 106. Note that at a given location, the wireless terminal may be able to receive the reference signals from multiple base stations 102, 114. On the other hand, the wireless terminal may not be able to receive the reference signals from all the base stations in the entire system. In the exemplary system, wireless terminal $m_0$ monitors $G_{0,0}$ for its connected base station $B_0$, and $G_{0,k}$ for base station $B_k$ if it can receive the corresponding reference signal. Therefore, wireless terminal $m_0$ maintains an array of interference costs $\{r_{0,k}\}$ for the set of base stations whose reference signals it can receive Note that the wireless terminal 106 can derive the interference costs by combining the estimation from multiple reference signals. For example, in the exemplary OFDM system 100, the wireless terminal 106 may use both beacons and pilots to arrive at the estimation of $\{r_{0,k}\}$.

The information of interference costs $\{r_{0,k}\}$ is to be used to control the uplink interference and increase overall system capacity. The uplink traffic channels can be used in two modes and the following describes the use of interference costs in both modes.

It should be pointed out that the wireless terminals 106, 108 measured the channel gain information from the downlink reference signals, while the interference are a measure of the costs the interference will have in terms of impact on the uplink. The channel gains of the downlink and the uplink between a wireless terminal 106 and a base station 102 may not be same at all times. To remove the effect of short-term, the estimates of the channel gains from the downlink reference signals may, and in some embodiments are, averaged (using a form of lowpass filtering for example) to obtain the estimates of interference costs $\{r_{0,k}\}$.

Use of determined Interference Costs in a Scheduled Mode of operation will now be discussed. In one particular exemplary mode of operation, each of the uplink traffic segments are explicitly assigned by the base station so that one uplink traffic segment is only used by at most one wireless terminal. In the exemplary OFDM system, as the traffic segments are orthogonal with each other, there is normally no intracell interference in an uplink traffic segment in this mode.

To facilitate scheduling at the base station 102, in accordance with the invention, each wireless terminal 206, 108 sends to the base station 102, which the wireless terminal 106 is connected to, a sequence of interference reports. The reports, in some embodiments are indicative of the calculated interference costs $\{r_{0,k}\}$. In an extreme case, a report is a control message that includes the entire array of interference costs $\{r_{0,k}\}$. To reduce the signaling overhead, however, in a preferred embodiment only a quantized version of the array $\{r_{0,k}\}$ is transmitted. There are a number of ways to quantize $\{r_{0,k}\}$, as listed below.

Report $r_{0,total}$, which is the sum of all $\{r_{0,k}\}$.

Report the maximum of $\{r_{0,k}\}$ and the index k associated with the maximum.

Report $\{r_{0,k}\}$ one-by-one, and the associated index k, periodically.

Use a small number of levels to report $r_{0,k}$. For example, two levels to indicate whether $r_{0,k}$ is strong or weak.

After receiving the one or more interference reports, the base station schedules, e.g., assigns, the traffic segments as a function of the interference information. One scheduling policy is to restrict the total interference produced by all scheduled wireless terminals to a pre-determined threshold. Another scheduling policy is categorize the wireless terminals according to their reported $\{r_{0,k}\}$ to several groups such that the group with large interference costs is preferably assigned traffic segments that include a smaller frequency extent in order to reduce the impact of the instantaneous interference generated.

Consider one embodiment in which each base station 102 is aware of its neighbor set, i.e., the set of base stations 114, etc. that are determined to be neighbors from the perspective of interference. In a basic embodiment, the base station 102 just attempts to control the total interference to the neighboring base stations. The basic embodiment may be coarse in the sense that almost all the interference may be directed to a particular one of the neighboring base stations (cell X), e.g., because all the scheduled wireless terminals may be close to cell X. In this case, cell X experiences severe interference at this time instant. At another time instant, the interference may be concentrated on a different neighboring base station, in which case cell X experiences little interference. Hence, in the above embodiment of total interference control, the interference to a particular neighboring base station may have large variation. In order to avoid destabilizing the intercell interference, the base station 102 may have to leave sufficient margin in the total generated interference to compensate the large variation.

In an enhanced embodiment, the base station 102 broadcasts a message on a common control channel instructing the wireless terminals 106, 108 to determine and report the interference cost with respect to a particular base station $B_k$. Thus, the wireless terminals, $m_j$, j=0, 1, 2, . . . will send the reports of $r_{j,k}$. Over time, the base station 102 repeats this process for each member of its neighbor set and determines the set of wireless terminals 106, 108 that interfere with each of the base stations. Once this categorization is complete, the base station 102 can simultaneously allocate uplink traffic segments to a subset of wireless terminals 106, 108 that interfere with different base stations, thereby reducing the variation of the interference directed to any particular base station. Advantageously, because the interference has less variation, the base station 102 may allow greater total interference to be generated without severely impacting the system stability, thus increasing the system capacity. Wireless terminals 106, 108 in the interior of the cell 104 cause negligible interference to neighboring base stations 114 and therefore may be scheduled at any time.

Use of Interference Costs in a Non-scheduled Mode of operation used in some but not necessarily all implementations will now be discussed.

In this non-scheduled mode, each of the uplink traffic segments are not explicitly assigned by the base station 102. As a result, one uplink traffic segment may be used by multiple wireless terminals 106, 108. In a CDMA system, as the uplink traffic segments are not orthogonal with each other, there is generally intracell interference in an uplink traffic segment in this mode.

In this mode, each wireless terminal 106, 108 makes its own scheduling decision of whether it is to use an uplink traffic segment and if so at what data rate and power. To help reduce excessive interference and maintain system stability, in accordance with the invention, the base station broadcasts the interference control indicator. Each wireless terminal 106, 108 compares the reference levels with its interference costs and determines its scheduling decision.

In one embodiment, the interference control indicator can be a multi-level variable and each level is to indicate how tightly the base station 102 would like to control the total interference. For example, when the lowest level is broadcasted, then all wireless terminals 106, 108 are allowed to use all the traffic channel segments at all rates. When the highest level is broadcasted, then only the wireless terminals 106, 108 whose interference costs are very low can use the traffic channel segments. When a medium level is broadcasted, then the wireless terminals 106, 108 whose interference costs are low can use all the traffic channel segments, preferably the traffic segments that include a larger frequency extent, while the wireless terminals 106, 108 whose interference costs are high can only use the traffic segments that consist of a smaller frequency extent and at lower data rate. The base station 102 can dynamically change the broadcasted interference control level to control the amount of interference the wireless terminals 106, 108 of the cell 104 generate to other base stations.

While described in the context of an OFDM system, the methods and apparatus of the present invention, are applicable to a wide range of communications systems including many non-OFDM and/or non-cellular systems.

In various embodiments nodes described herein are implemented using one or more modules to perform the steps corresponding to one or more methods of the present invention, for example, signal processing, beacon generation, beacon detection, beacon measuring, connection comparisons, connection implementations. In some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A method of operating a wireless terminal, the method comprising:
   receiving a first signal from a first base station with which the wireless terminal has a connection;
   receiving a second signal from a second base station;
   measuring the power of the first received signal;
   measuring the power of the second received signal; and
   transmitting a report indicating a ratio of a first value to a second value, the first and second values being a function of the measured power of the first received signal and the measured power of the second received signal, respectively.

2. The method of claim 1, wherein at least the first value is different from, but determined from, the measured power of the first signal or wherein the second value is different from but determined from the measured power of the second signal.

3. The method of claim 1, wherein the first received signal is one of a beacon signal and a pilot signal received from the first base station.

4. The method of claim 3, wherein the second signal is a signal that was transmitted at a higher per tone power level than any user data transmitted during the duration of the second signal by the base station which transmitted said second signal.

5. The method of claim 3, further comprising:
   prior to receiving said first signal, receiving an additional beacon signal from said first base station;
   measuring the power of the additional received beacon signal; and
   wherein first value is a function of an average of the measured power of the first signal and the measured power of said additional received signal.

6. The method of claim 5, wherein the first value is equal to an average of the measured power of the first received signal and the measured power of said additional received signal multiplied by a gain factor where the gain factor is a function of the relative transmission power of the first and second signals.

7. The method of claim 5, further comprising:
   prior to receiving said second signal, receiving a second additional beacon signal from said second base station;
   measuring the power of the second additional received beacon signal; and
   wherein second value is a function of an average of the measured power of the second signal and the measured power of said second additional received beacon signal.

8. The method of claim 1, wherein the first value is equal to the measured power of the first received signal.

9. The method of claim 8, wherein the second value is equal to the measured power of the second received signal.

10. The method of claim 1, wherein the first value is equal to the measured power of the first received signal multiplied by a gain factor where the gain factor is a function of the relative transmission power of the first and second signals.

11. The method of claim 1, wherein the second value is equal to the measured power of the second received signal multiplied by a gain factor where the gain factor is a function of the relative transmission power of the first and second signals.

12. The method of claim 1, wherein the first and second signals are reference signals, said reference signals being transmitted at a first and a second fixed power level, respectively, the method further comprising:
receiving one or more additional beacon signals form one or more additional base stations respectively,
measuring the power of the received one or more additional beacon signals;
wherein the method includes determining the second value from the measured power of the second signal and the measured power of the one or more additional beacon signals; and
wherein the first value is equal to measured power of the first signal.

13. The method of claim 12, wherein determining the second value includes:
setting said second value to the maximum of the measured power of the second signal and the one or more additional beacon signals.

14. The method of claim 12, wherein determining the second value includes:
setting said second value to the sum of the measured power of the second signal and the one or more additional beacon signals.

15. A wireless terminal comprising:
a receiver module for receiving a first signal from a first base station with which the wireless terminal has a connection and a second signal from a second base station;
a power measurement module for measuring the power of the first and second received signals; and
a report generation module for generating a report indicating a ratio of a first value to a second value, the first and second values being a function of the measured power of the first received signal and the measured power of the second received signal, respectively.

16. The wireless terminal of claim 15, wherein at least the first value is different from, but determined from, the measured power of the first signal or wherein the second value is different from but determined from the measured power of the second signal.

17. The wireless terminal of claim 15, wherein the first received signal is one of a beacon signal and a pilot signal received from the first base station.

18. The wireless terminal of claim 17, wherein the second signal is a signal that was transmitted at a higher per tone power level than any user data transmitted during the duration of the second signal by the base station which transmitted said second signal.

19. The wireless terminal of claim 15, wherein said report generation module sets the first value equal to the measured power of the first received signal.

20. The wireless terminal of claim 19, wherein the second value is equal to the measured power of the second received signal.

21. The wireless terminal of claim 15, wherein the first value is equal to the measured power of the first received signal multiplied by a gain factor where the gain factor is a function of the relative transmission power of the first and second signals.

22. The wireless terminal of claim 15, wherein the second value is equal to the measured power of the second received signal multiplied by a gain factor where the gain factor is a function of the relative transmission power of the first and second signals.

23. A device comprising a processor configured to control the device to implement a method, the method comprising:
receiving a first signal from a first base station with which the wireless terminal has a connection;
receiving a second signal from a second base station;
measuring the power of the first received signal;
measuring the power of the second received signal; and
transmitting a report indicating a ratio of a first value to a second value, the first and second values being a function of the measured power of the first received signal and the measured power of the second received signal, respectively.

24. The device of claim 23, wherein at least the first value different from, but determined from, the measured power of the first signal or wherein the second value is different from but determined from the measured power of the second signal.

25. The device of claim 23, wherein the first received signal is one of a beacon signal and a pilot signal received from the first base station.

26. A computer readable medium embodying machine executable instructions for controlling a device to implement a method, the method comprising:
receiving a first signal from a first base station with which the wireless terminal has a connection;
receiving a second signal from a second base station;
measuring the power of the first received signal;
measuring the power of the second received signal; and
transmitting a report indicating a ratio of a first value to a second value, the first and second values being a function of the measured power of the first received signal and the measured power of the second received signal, respectively.

27. The computer readable medium of claim 26, wherein at least the first value is different from, but determined from, the measured power of the first signal or wherein the second value is different from but determined from the measured power of the second signal.

28. The computer readable medium of claim 26, wherein the first received signal is one of a beacon signal and a pilot signal received from the first base station.

29. A wireless terminal comprising:
means for receiving a first signal from a first base station with which the wireless terminal has a connection and a second signal from a second base station;
means for measuring the power of the first and the second received signals; and
means for generating a report indicating a ratio of a first value to a second value, the first and second values being a function of the measured power of the first received signal and the measured power of the second received signal, respectively.

30. The wireless terminal of claim 29, wherein at least the first value is different from, but determined from, the measured power of the first signal or wherein the second value is different from but determined from the measured power of the second signal.

31. The wireless terminal of claim 29, wherein the first received signal is one of a beacon signal and a pilot signal received from the first base station.

* * * * *